(12) United States Patent
Farag

(10) Patent No.: US 12,563,516 B2
(45) Date of Patent: Feb. 24, 2026

(54) METHODS AND APPARATUS FOR ROUND-TRIP-TIME MEASUREMENT ON A SL INTERFACE

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 18/303,350

(22) Filed: Apr. 19, 2023

(65) Prior Publication Data

US 2023/0354238 A1 Nov. 2, 2023

Related U.S. Application Data

(60) Provisional application No. 63/445,951, filed on Feb. 15, 2023, provisional application No. 63/336,808, filed on Apr. 29, 2022.

(51) Int. Cl.
| | |
|---|---|
| *H04W 56/00* | (2009.01) |
| *H04L 5/00* | (2006.01) |
| *H04W 4/029* | (2018.01) |
| *H04W 64/00* | (2009.01) |
| *H04W 72/0446* | (2023.01) |

(52) U.S. Cl.
CPC ....... *H04W 56/0055* (2013.01); *H04L 5/0051* (2013.01); *H04W 4/029* (2018.02); *H04W 64/00* (2013.01); *H04W 72/0446* (2013.01)

(58) Field of Classification Search
CPC . H04W 56/0055; H04W 4/029; H04W 64/00; H04W 72/0446; H04L 5/0051; H04L 5/0048
See application file for complete search history.

(56) References Cited

U.S. PATENT DOCUMENTS

| | | | |
|---|---|---|---|
| 2020/0229016 A1 | 7/2020 | Manolakos et al. | |
| 2021/0235304 A1 | 7/2021 | Akkarakaran et al. | |
| 2022/0361142 A1 | 11/2022 | Ko et al. | |
| 2023/0052126 A1* | 2/2023 | Nam ........................ | H04L 5/00 |

(Continued)

FOREIGN PATENT DOCUMENTS

| | | |
|---|---|---|
| WO | 2020256311 A1 | 12/2020 |
| WO | 2022027298 A1 | 2/2022 |

OTHER PUBLICATIONS

International Search Report and Written Opinion issued Jul. 28, 2023 regarding International Application No. PCT/KR2023/005917, 7 pages.

(Continued)

*Primary Examiner* — Kabir A Timory

(57) ABSTRACT

A method of operating a user equipment (UE) is provided. The method includes receiving, from a second UE, a first sidelink (SL) positioning reference signal (PRS) in slot m; measuring a receive (Rx) timing of the first SL PRS in the slot m; and determining a reference transmit (Tx) timing of the slot m. The method further includes determining a first SL Rx–Tx time difference as a difference between the Rx timing of the first SL PRS in the slot m and the reference Tx timing of the slot m and determine information for a first report based on the first SL Rx–Tx time difference.

12 Claims, 12 Drawing Sheets

SL-RSTD (reference signal time difference) is measured at UE1 as the difference between a time of arrival of a SL-PRS transmitted from a reference UE (UE2) and time of arrival of a SL-PRS transmitted from a target UE (UE3)

(56)                References Cited

U.S. PATENT DOCUMENTS

2023/0296752 A1\*   9/2023  Thomas ................ H04L 5/0048
                                                    342/125
2024/0430046 A1\*  12/2024  Manolakos ........... H04W 24/08

OTHER PUBLICATIONS

Ericsson, "Correction to UE Rx-Tx measurement report mapping", 3GPP TSG-RAN4 Meeting #97-e, R4-2016401, Nov. 2020, 7 pages.
"5G; NR; Physical channels and modulation (3GPP TS 38.211 version 17.4.0 Release 17)", ETSI TS 138 211 V17.4.0, Jan. 2023, 141 pages.
"3rd Generation Partnership Project; Technical Specification Group Radio Access Network; NR; Multiplexing and channel coding (Release 17)", 3GPP TS 38.212 V17.5.0, Mar. 2023, 203 pages.
"3rd Generation Partnership Project; Technical Specification Group Radio Access Network; NR; Physical layer procedures for control (Release 17)", 3GPP TS 38.213 V17.5.0, Mar. 2023, 262 pages.
3rd Generation Partnership Project; Technical Specification Group Radio Access Network; NR; Physical layer procedures for data (Release 17), 3GPP TS 38.214 V17.5.0, Mar. 2023, 231 pages.
"3rd Generation Partnership Project; Technical Specification Group Radio Access Network; NR; Physical layer measurements (Release 17)", 3GPP TS 38.215 V17.3.0, Mar. 2023, 26 pages.
"3rd Generation Partnership Project; Technical Specification Group Radio Access Network; NR; Medium Access Control (MAC) protocol specification (Release 17)", 3GPP TS 38.321 V17.4.0, Mar. 2023, 252 pages.
"3rd Generation Partnership Project; Technical Specification Group Radio Access Network; NR; Radio Resource Control (RRC) protocol specification (Release 17)", 3GPP TS 38.331 V17.4.0, Mar. 2023, 1321 pages.
"3rd Generation Partnership Project; Technical Specification Group Radio Access Network; Evolved Universal Terrestrial Radio Access (E-UTRA); Physical layer procedures (Release 17)", 3GPP TS 36.213 V17.5.0, Mar. 2023, 584 pages.
"3rd Generation Partnership Project; Technical Specification Group Radio Access Network; Study on scenarios and requirements of in-coverage, partial coverage, and out-of-coverage NR positioning use cases (Release 17)", 3GPP TR 38.845 V17.0.0, Sep. 2021, 16 pages.

\* cited by examiner

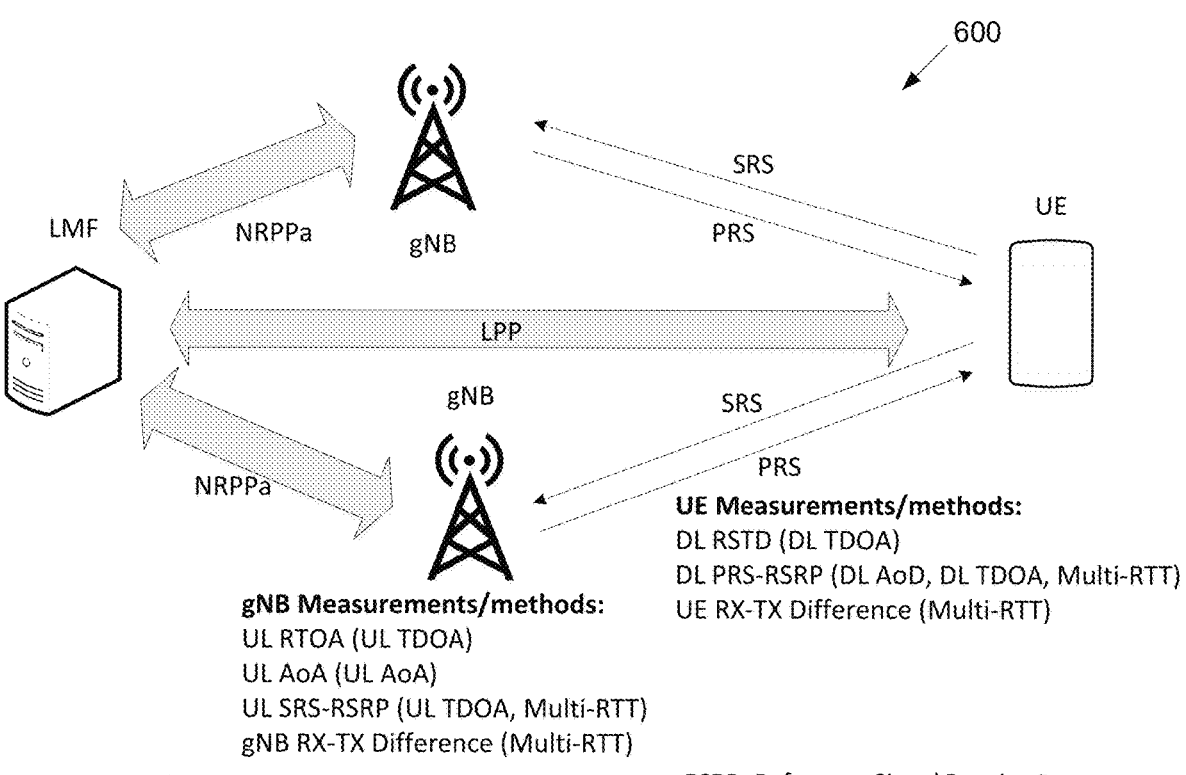

gNB Measurements/methods:
UL RTOA (UL TDOA)
UL AoA (UL AoA)
UL SRS-RSRP (UL TDOA, Multi-RTT)
gNB RX-TX Difference (Multi-RTT)

UE Measurements/methods:
DL RSTD (DL TDOA)
DL PRS-RSRP (DL AoD, DL TDOA, Multi-RTT)
UE RX-TX Difference (Multi-RTT)

AoA: Angle of Arrival
AoD: Angle of Departure
LMF: Location Management Function
LPP: LTE Positioning Protocol
NRPPa: NR Positioning Protocol annex
PRS: Positioning Reference Signal

RSRP: Reference Signal Receive Power
RSTD: Reference Signal Time Difference
RTOA: Relative Time of Arrival
RTT: Round Trip Time
SRS: Sounding Reference Signal
TDOA: Time Difference Of Arrival

FIG. 6A

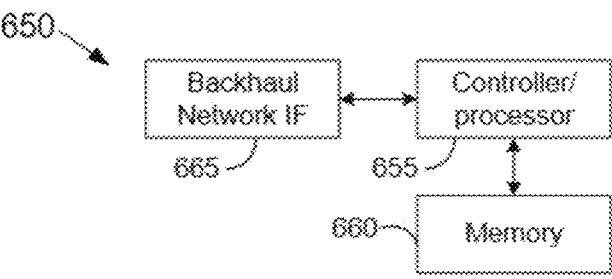

Network configures UE with resources to use for:
1. SL positioning reference signals
2. Reporting of SL positioning measurements UE within network
coverage Network (gNB)

800

First UE Tx

First UE Rx

Second UE Tx

Second UE Rx

Slot m1

Slot m2

Slot n2

$\Delta$

UE1 Rx-Tx time

Slot n1

Slot n2

Slot m1

$T_{prop}$ $T_{prop}$ $\Delta$

UE2 Rx-Tx time $T_{prop}$ is the one way propagation delay

1100

1200

1400

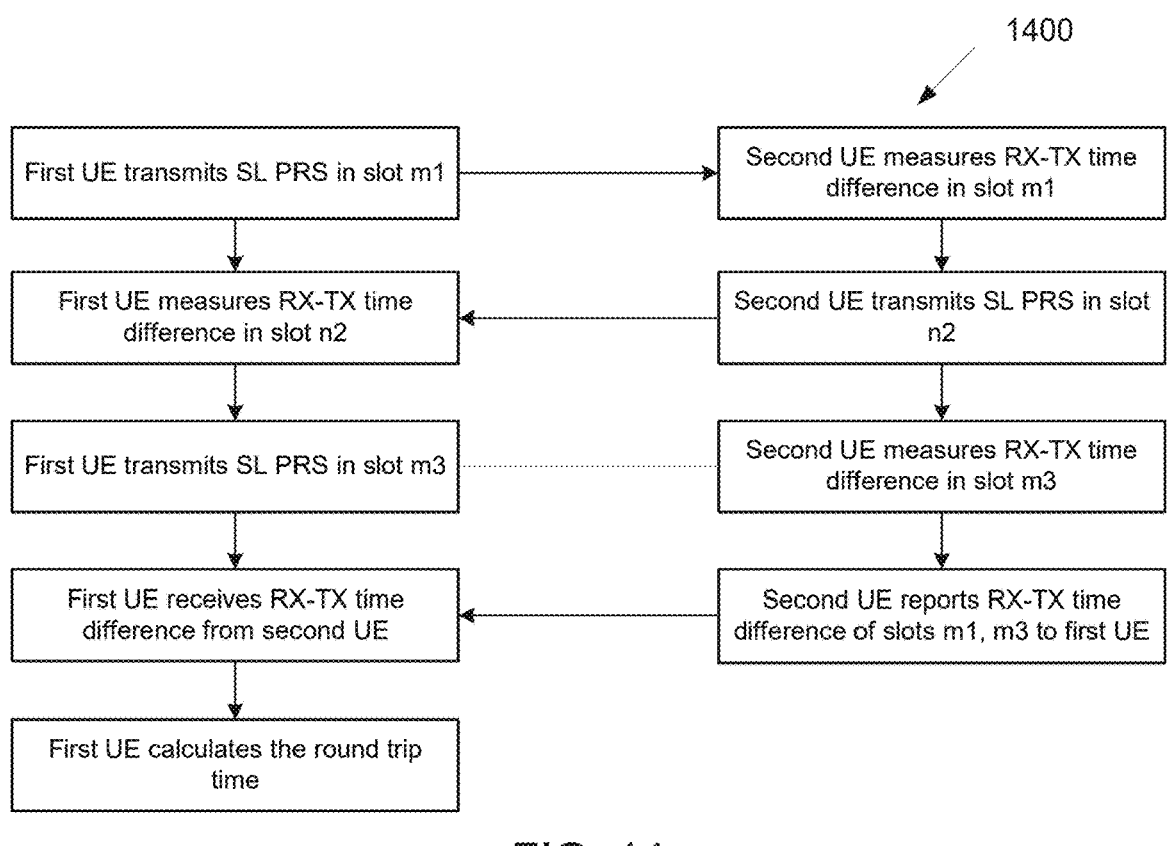

| First UE transmits SL PRS in slot m1 | → | Second UE measures RX-TX time difference in slot m1 |
| First UE measures RX-TX time difference in slot n2 | ← | Second UE transmits SL PRS in slot n2 |
| First UE transmits SL PRS in slot m3 | ⋯ | Second UE measures RX-TX time difference in slot m3 |
| First UE receives RX-TX time difference from second UE | ← | Second UE reports RX-TX time difference of slots m1, m3 to first UE |
| First UE calculates the round trip time | | |

| First UE transmits SL PRS in slot m1 | → | Second UE measures RX-TX time difference in slot m1 |
| First UE measures RX-TX time difference in slot n2 | ← | Second UE transmits SL PRS in slot n2 |
| First UE transmits SL PRS in slot m3 | → | Second UE measures RX-TX time difference in slot m3 |
| First UE reports RX-TX time difference of slot n2 to second UE | ← | Second UE receives RX-TX time difference from first UE |
| | | Second UE calculates the round trip time |

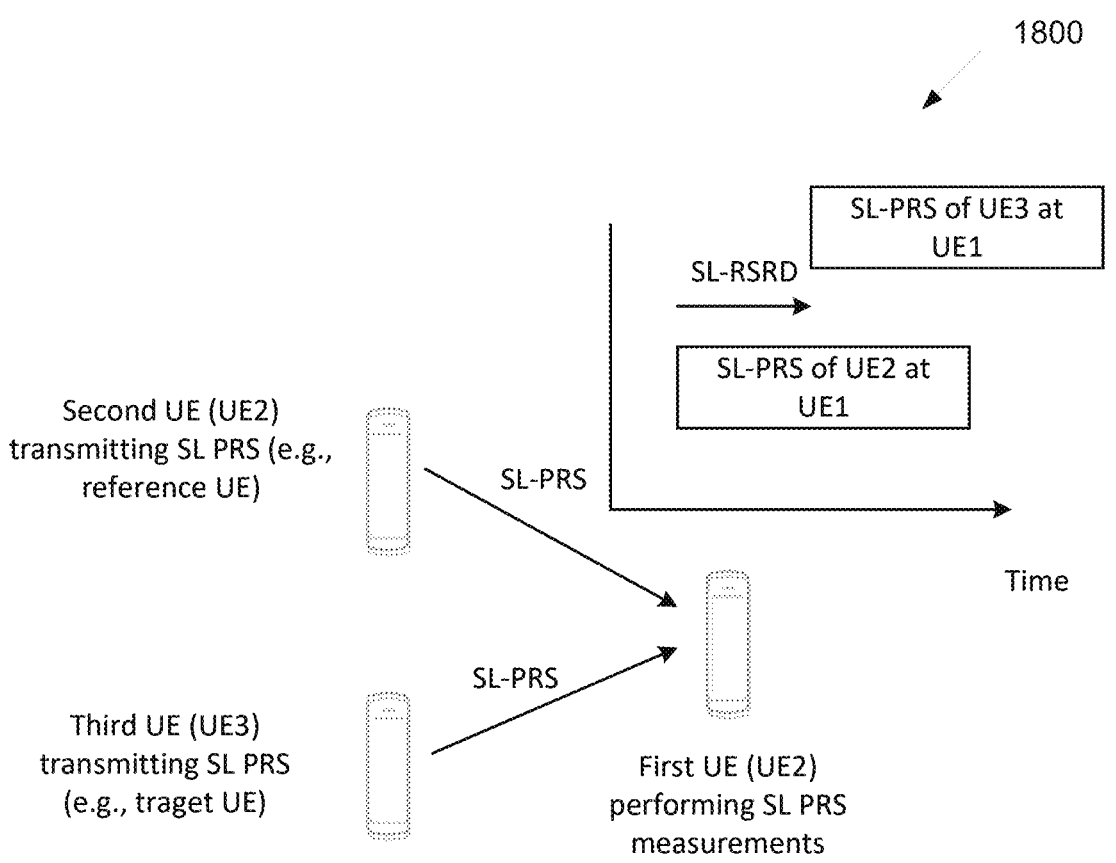

Second UE (UE2) transmitting SL PRS (e.g., reference UE)

SL-PRS

SL-RSRD

SL-PRS of UE3 at UE1

SL-PRS of UE2 at UE1

Time

Third UE (UE3) transmitting SL PRS (e.g., traget UE)

SL-PRS

First UE (UE2) performing SL PRS measurements

SL-RSTD (reference signal time difference) is measured at UE1 as the difference between a time of arrival of a SL-PRS transmitted from a reference UE (UE2) and time of arrival of a SL-PRS transmitted from a target UE (UE3)

FIG. 18

METHODS AND APPARATUS FOR ROUND-TRIP-TIME MEASUREMENT ON A SL INTERFACE

CROSS-REFERENCE TO RELATED APPLICATIONS AND CLAIM OF PRIORITY

The present application claims priority to U.S. Provisional Patent Application No. 63/336,808, filed on Apr. 29, 2022, and U.S. Provisional Patent Application No. 63/445,951, filed on Feb. 15, 2023. The contents of the above-identified patent document are incorporated herein by reference.

TECHNICAL FIELD

The present disclosure relates generally to wireless communication systems and, more specifically, the present disclosure relates to round-trip-time measurement on a sidelink (SL) interface in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to round-trip-time measurement on a SL interface in a wireless communication system.

In one embodiment, a user equipment (UE) is provided. The UE includes a transceiver configured to receive, from a second UE, a first SL positioning reference signal (PRS) in slot m and a processor operably coupled to the transceiver. The processor is configured to measure a receive (Rx) timing of the first SL PRS in the slot m, determine a reference transmit (Tx) timing of the slot m, determine a first SL Rx–Tx time difference as a difference between the Rx timing of the first SL PRS in the slot m and the reference Tx timing of the slot m, and determine information for a first report based on the first SL Rx–Tx time difference.

In another embodiment, a method of operating a UE is provided. The method includes receiving, from a second UE, a first SL PRS in slot m; measuring a Rx timing of the first SL PRS in the slot m; and determining a reference Tx timing of the slot m. The method further includes determining a first SL Rx–Tx time difference as a difference between the Rx timing of the first SL PRS in the slot m and the reference Tx timing of the slot m and determine information for a first report based on the first SL Rx–Tx time difference.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The term "module" means any device, system, or part thereof that controls at least one operation. Such a module may be implemented in hardware or a combination of hardware and software and/or firmware. The functionality associated with any particular module may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6A illustrates an example of network positioning architecture according to embodiments of the present disclosure;

FIG. 6B illustrates an example location management function (LMF) according to embodiments of the present disclosure;

FIGS. 14 to 16 illustrate examples of UE measurement operation according to embodiments of the present disclosure;

FIG. 18 illustrates examples of SL measurements according to embodiments of the present disclosure.

DETAILED DESCRIPTION

Figure 1:
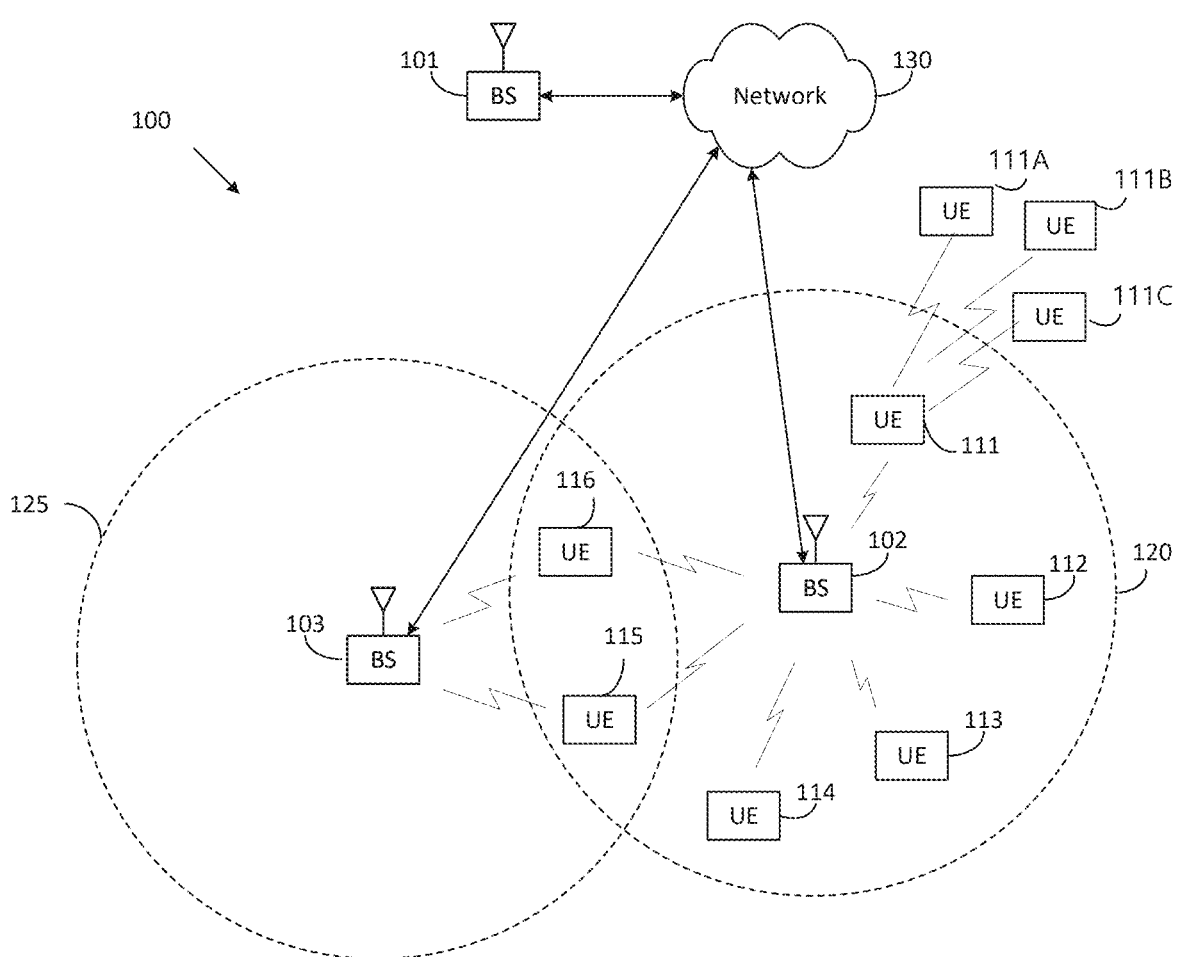
FIG. 1 illustrates an example of wireless network according to embodiments of the present disclosure.

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.4.0, "NR; Physical channels and modulation"; 3GPP TS 38.212 v17.5.0, "NR; Multiplexing and Channel coding"; 3GPP TS 38.213 v17.5.0, "NR; Physical Layer Procedures for Control"; 3GPP TS 38.214 v17.5.0, "NR; Physical Layer Procedures for Data"; 3GPP TS 38.215 v17.3.0, "NR; Physical Layer Measurements"; 3GPP TS 38.321 v17.4.0, "NR; Medium Access Control (MAC) protocol specification"; 3GPP TS 38.331 v17.4.0, "NR; Radio Resource Control (RRC) Protocol Specification"; 3GPP TS 36.213 v17.5.0, "Evolved Universal Terrestrial Radio Access (E-UTRA); Physical layer procedures", and 3GPP TR 38.845 v17.0.0, "Study on scenarios and requirements of in-coverage, partial coverage, and out-of-coverage NR positioning use cases."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
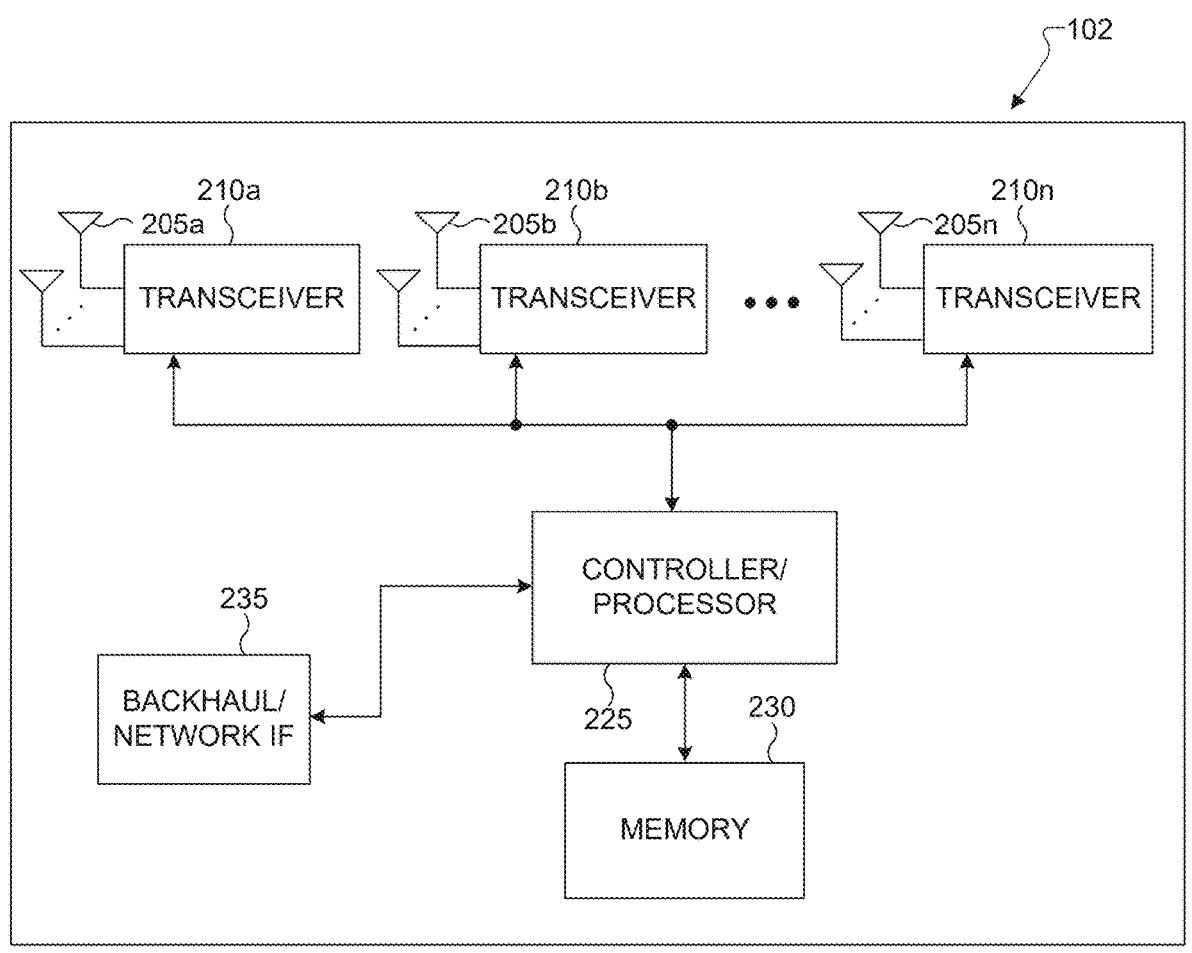
FIG. 2 illustrates an example of gNB according to embodiments of the present disclosure.
Figure 3:
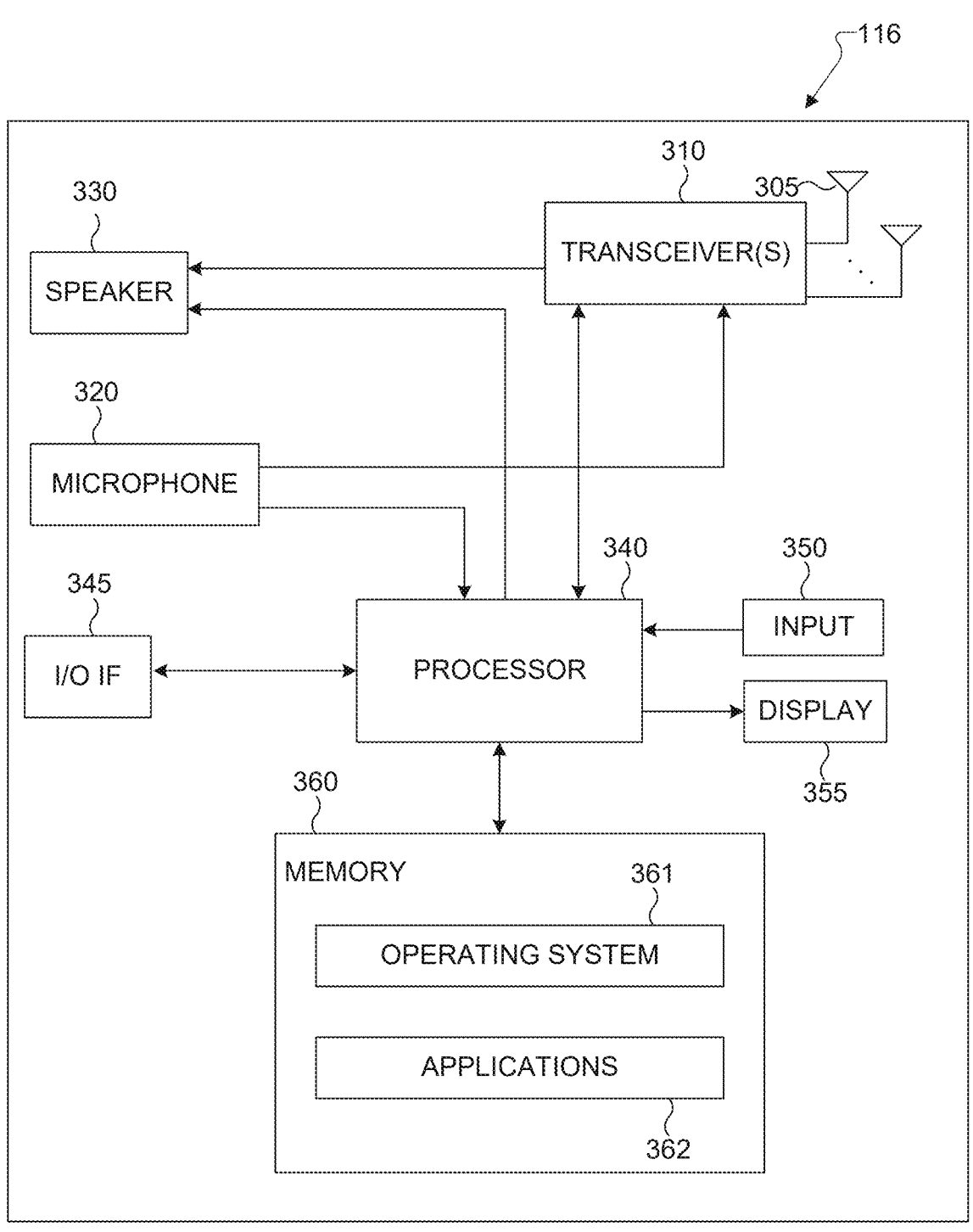
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for sending and/or receiving a signaling for a round-trip-time measurement on SL interface in a wireless communication system. In certain embodiments, and one or more of the gNBs 101-103 includes circuitry, programing, or a combination thereof, to support round-trip-time measurement on SL interface in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sidelink communication and/or sidelink positioning, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication and/or positioning with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channels and/or signals and the transmission of DL channels and/or signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for to provide or support a round-trip-time measurement on a SL interface.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a round-trip-time measurement on SL interface in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
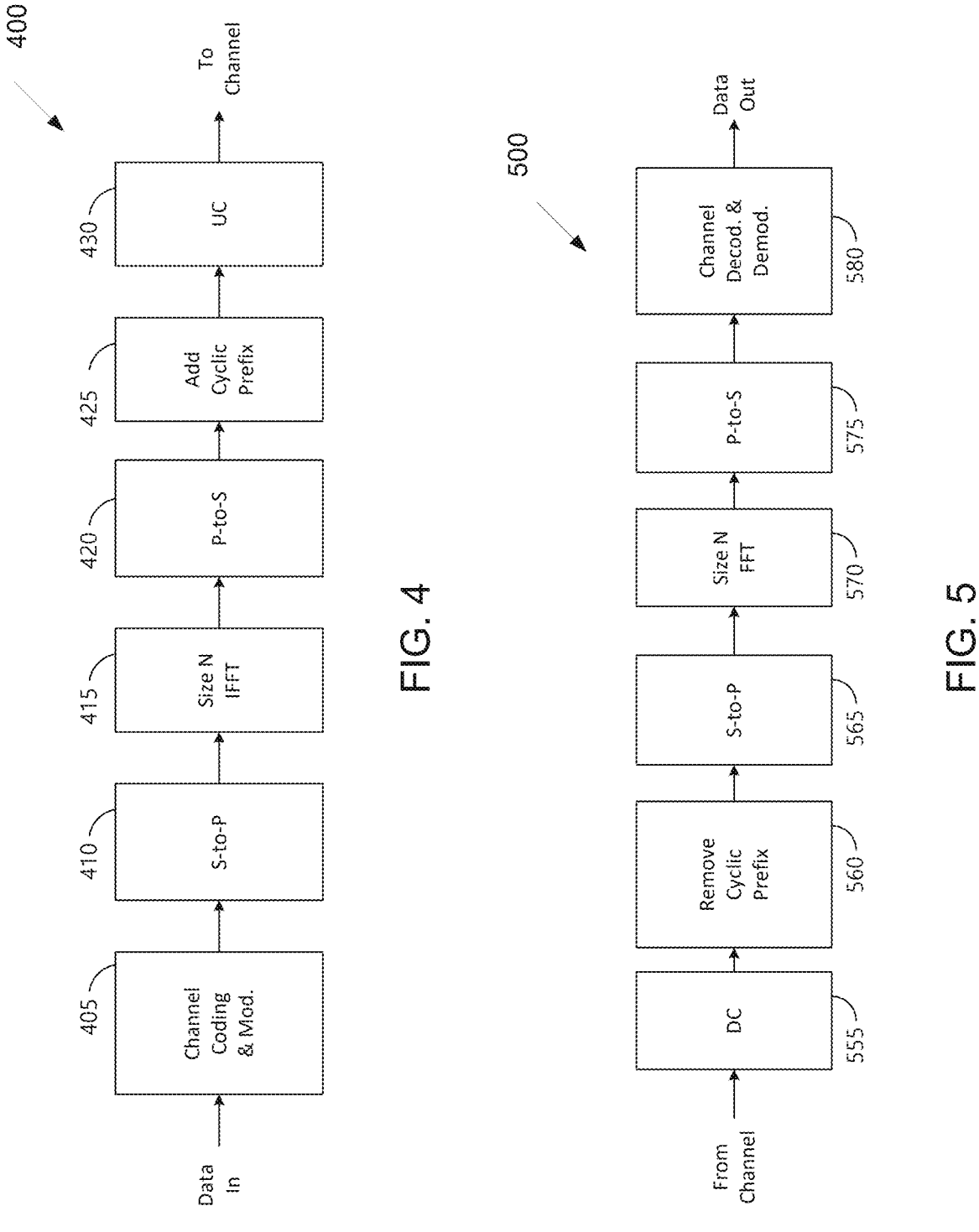
FIGS. 4 and 5 illustrate example of wireless transmit and receive paths according to the present disclosure.

FIG. 4 and FIG. 5 illustrate example wireless transmit and receive paths according to the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications and/or SL positioning. In some embodiments, the receive path 500 is configured to support a round-trip-time measurement on SL interface in a wireless communication system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of the present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 KHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications and/or SL positioning. A UE can be configured one or more bandwidth parts (BWPs) of a system BW for transmissions or receptions of signals or channels.

An NR supports positioning on the Uu interface. In the DL, positioning reference signal (PRS) can be transmitted by a gNB to a UE to enable the UE to perform positioning measurements. In the UL a UE can transmit positioning sounding reference signal (SRS) to enable a gNB to perform positioning measurements. UE measurements for positioning include; DL PRS reference signal received power (DL PRS RSRP), DL PRS reference signal received path power (DL PRS-RSRPP), DL reference signal time difference (DL RSTD), UE Rx–Tx time difference, NR enhanced cell ID (E-CID), DL SSB radio resource management (RRM) measurement, and NR E-CID DL CSI-RS RRM measurement. NG-RAN measurements for positioning include; UL relative time of arrival (UL-RTOA), UL angle of arrival (UL AoA), UL SRS reference signal received power (UL SRS-RSRP), UL SRS reference signal received path power (UL SRS-RSRPP) and gNB Rx–Tx time difference. NR introduced several radio access technology (RAT) dependent positioning methods; time difference of arrival based methods such DL time difference of arrival (DL-TDOA) and UL time difference of arrival (UL TDOA), angle based methods such as UL angle of arrival (UL AoA) and DL angle of departure (DL AoD), multi-round trip time (RTT) based methods and E-CID based methods.

Positioning schemes can be UE-based, i.e., the UE determines the location or UE-assisted (e.g., location management function (LMF) based), i.e., UE provides measurements for a network entity (e.g., LMF) to determine the location, or NG-RAN node assisted (i.e., NG-RAN node such as gNB provides measurement to LMF). LTE positioning protocol (LPP), as illustrated in 3GPP standard specification TS 37.355, first introduce for LTE and then extended to NR is used for communication between the UE and LMF. NR positioning protocol annex (NRPPa), as illustrated in 3GPP standard specification TS 38.455, is used for communication between the gNB and the LMF.

FIG. 6A illustrates an example of network positioning architecture 600 according to embodiments of the present disclosure. An embodiment of the network positioning architecture 600 shown in FIG. 6A is for illustration only. FIG. 6A illustrates the overall positioning architecture along with positioning measurements and methods.

FIG. 6B illustrates an example LMF 650 according to embodiments of the present disclosure. The embodiment of the LMF 650 shown in FIG. 6B is for illustration only. However, LMFs come in a wide variety of configurations, and FIG. 6B does not limit the scope of this disclosure to any particular implementation of an LMF.

As shown in FIG. 6B, the LMF 650 includes a controller/processor 655, a memory 660, and a backhaul or network interface 665. The controller/processor 655 can include one or more processors or other processing devices that control the overall operation of the LMF 650. For example, the controller/processor can support functions related to positioning and location services or round-trip-time measurement on SL interface. Any of a wide variety of other functions can be supported in the LMF 650 by the controller/processor 655. In some embodiments, the controller/processor 655 includes at least one microprocessor or microcontroller.

The controller/processor 655 is also capable of executing programs and other processes resident in the memory 660, such as a basic OS. In some embodiments, the controller/processor 655 supports communications between entities, such as gNB 102 and UE 116 and supports protocols such as LPP and NRPPA. The controller/processor 655 can move data into or out of the memory 660 as required by an executing process.

The controller/processor 655 is also coupled to the backhaul or network interface 665. The backhaul or network interface 665 allows the LMF 650 to communicate with other devices or systems over a backhaul connection or over a network. The interface 665 can support communications over any suitable wired or wireless connection(s). For example, when the LMF 650 is implemented as part of a cellular communication system or wired or wireless local area network (such as one supporting 5G, LTE, or LTE-A), the interface 665 can allow the LMF 650 to communicate with gNBs or eNBs or other network elements over a wired or wireless backhaul connection. The interface 665 includes any suitable structure supporting communications over a wired or wireless connection, such as an Ethernet or RF transceiver.

The memory 660 is coupled to the controller/processor 655. Part of the memory 660 can include a RAM, and another part of the memory 660 can include a Flash memory or other ROM. In certain embodiments, a plurality of instructions, such as a location management algorithm is stored in memory 660. The plurality of instructions is configured to cause the controller/processor 655 to perform location management process and to utilize round-trip-time measurement on SL interface.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, PSFCHs can also convey conflict information, and physical SL broadcast channel (PSBCH) conveying system information to assist in SL synchronization.

SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH, and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format (e.g., DCI Format 3_0). In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured one of two options for reporting of HARQ-ACK information by the UE: (1) HARQ-ACK reporting option 1, a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB; and (2) HARQ-ACK reporting option 2, a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option 1, when a UE that transmitted the PSSCH detects a NACK in a PSFCH reception, the UE can transmit another PSSCH with the TB (retransmission of the TB). In HARQ-ACK reporting option 2 when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $\{t'_0{}^{SL}, t'_1{}^{SL}, t'_2{}^{SL}, \ldots, t'_{T'_{MAX}-1}{}^{SL}\}$ and can be configured, for example, at least using a bitmap. Where, $T'_{MAX}$ is the number of SL slots in a resource pool, e.g., in 1024 frames. Within each slot $t'_y{}^{SL}$ of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m \cdot n_{subCHsize}+j$, where j=0, 1, . . . , $n_{subCHsize}-1$. $n_{subCHstart}$ and $n_{subCHsize}$ are provided by higher layer parameters.

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels x+i, where i=0, 1, . . . , $L_{subCH}-1$ in slot $t_y{}^{SL}$. $T_1$ is determined by the UE such that, $0 \leq T_1 \leq T_{proc,1}{}^{SL}$, where $T_{proc,1}{}^{SL}$ is a PSSCH processing time for example as defined in TS 38.214. $T_2$ is determined by the UE such that $T_{2min} \leq T_2 \leq$ Remaining Packet Delay Budget, as long as $T_{2min} <$ Remaining Packet Delay Budget, else $T_2$ is equal to the Remaining Packet Delay Budget. $T_2$ min is configured by higher layers and depends on the priority of the SL transmission.

The slots of a SL resource pool are determined as shown in TABLE 1.

TABLE 1

1. Let set of slots that may belong to a resource be denoted by $\{t_0{}^{SL}, t_1{}^{SL}, t_2{}^{SL}, \ldots, t_{T_{MAX}-1}{}^{SL}\}$; where $0 \leq t_i{}^{SL} < 10240 \times 2^\mu$, and $0 \leq i < T_{max}$. $\mu$ is the sub-carrier spacing configuration. $\mu = 0$ for a 15 kHz sub-carrier spacing. $\mu = 1$ for a 30 kHz sub-carrier spacing. $\mu = 2$ for a 60 kHz sub-carrier spacing. $\mu = 3$ for a 120 kHz sub-carrier spacing. The slot index is relative to slot#0 of SFN#0 (system frame number 0) of the serving cell, or DFN#0 (direct frame number 0). The set of slots includes all slots except:

a. $N_{S-SSB}$ slots that are configured for SL SS/PBCH Block (S-SSB).

b. $N_{nonSL}$ slots where at least one SL symbol is not not-semi-statically configured as UL symbol by higher layer parameter tdd-UL-DL-ConfigurationCommon or sl-TDD-Configurauion. In a SL slot, OFDM symbols Y-th, (Y + 1)-th, . . . , (Y + X − 1)-th are SL symbols, where Y is determined by the higher layer parameter sl-StartSymbol and X is determined by higher layer parameter sl-LengthSymbols.

c. $N_{reserved}$ reserved slots. Reserved slots are determined such that the slots in the set $\{t_0{}^{SL}, t_1{}^{SL}, t_2{}^{SL}, \ldots, t_{T_{MAX}-1}{}^{SL}\}$ is a multiple of the bitmap length ($L_{bitmap}$), where the bitmap $(b_0, b_1, \ldots, b_{L_{bitmap}-1})$ is configured by higher layers. The reserved slots are determined as follows:

i. Let $\{l_0, l_1, \ldots, l_{2^\mu \times 10240-N_{S-SSB}-N_{nonSL}-1}\}$ be the set of slots in range 0 . . . $2^\mu \times 10240 − 1$, excluding S-SSB slots and non-SL slots. The slots are arranged in ascending order of the slot index.

ii. The number of reserved slots is given by: $N_{reserved} = (2^\mu \times 10240 − NS\text{-}SSB − N_{nonsL})$ mod $L_{bitmap}$.

iii. The reserved slots $l_r$ are given by: $r = \left\lfloor \dfrac{m \cdot (2^\mu \times 10240 − N_{S-SSB} − N_{nonSL})}{N_{reserved}} \right\rfloor$, where m = 0, 1, . . . , $N_{reserved} − 1$ $T_{max}$ is given by: $T_{max} = 2^\mu \times 10240 − N_{S-SSB} − N_{nonSL} − N_{reserved}$.

2. The slots are arranged in ascending order of slot index.

3. The set of slots belonging to the SL resource pool, $\{t'_0{}^{SL}, t'_1{}^{SL}, t'_2{}^{SL}, \ldots, t'_{T'_{MAX}-1}{}^{SL}\}$, are determined as follows:

a. Each resource pool has a corresponding bitmap $(b_0, b_1, \ldots, b_{L_{bitmap}-1})$ of length $L_{bitmap}$.

b. A slot $t_k{}^{SL}$ belongs to the SL resource pool if $b_{k \bmod L_{bitmap}} = 1$ c. The remaining slots are indexed successively staring from 0, 1, $T'_{MAX} − 1$.

Where, $T'_{MAX}$ is the number of remaining slots in the set.

Slots can be numbered (indexed) as physical slots or logical slots, wherein physical slots include all slots numbered sequential, while logical slots include only slots that are allocated to sidelink resource pool as described above numbered sequentially. The conversion from a physical duration, $P_{rsvp}$, in milli-second to logical slots, $P_{rsvp}'$, is given by $$P_{rsvp}' = \left\lceil \frac{T_{max}'}{10240 \text{ ms}} \times P_{rsvp} \right\rceil$$

(as illustrated in 3GPP standard specification 38.214).

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels $x+i$, where $i=0, 1, \ldots, L_{subCH}-1$ in slot $t_y^{SL}$. $T_1$ is determined by the UE such that, $0 \leq T_1 \leq T_{proc,1}^{SL}$, where $T_{proc,1}^{SL}$ is a PSSCH processing time for example as defined 3GPP standard specification (TS 38.214). $T_2$ is determined by the UE depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with the excluded resources or any of reserved or semi-persistent transmissions; the identified candidate resources after resource exclusion are provided to higher layers and (2) the second step (e.g., preformed in the higher layers) is to select or re-select a resource from the identified candidate resources.

During the first step of the resource (re-)selection procedure, a UE can monitor slots in a sensing window $[n-T_0, n-T_{proc,0})$, where the UE monitors slots belonging to a corresponding sidelink resource pool that are not used for the UE's own transmission. To determine a candidate single-slot resource set to report to higher layers, a UE excludes (e.g., resource exclusion) from the set of available single-slot resources for SL transmission within a resource pool and within a resource selection window as shown in TABLE 2.

TABLE 2

| | |
|---|---|
| 1. | Single slot resource $R_{x,y}$, such that for any slot $t'_m{}^{SL}$ not monitored within the sensing window with a hypothetical received SCI Format 1-0, with a "Resource reservation period" set to any periodicity value allowed by a higher layer parameter reseverationPeriodAllowed, and indicating all sub-channels of the resource pool in this slot, satisfies condition 2.2. below. |
| 2. | Single slot resource $R_{x,y}$, such that for any received SCI within the sensing window: |
| |   1.  The associated L1-RSRP measurement is above a (pre-)configured SL-RSRP threshold, where the SL-RSRP threshold depends on the priority indicated in the received SCI and that of the SL transmission for which resources are being selected. |
| |   2.  (Condition 2.2) The received SCI in slot $t'_m{}^{SL}$, "Resource reservation field" is present in the received SCI the same SCI is assumed to be received in slot $t'_{m+q \times P'_{rsvp\_Rx}}{}^{SL}$, indicates a set of resource blocks that overlaps $R_{x,y+j \times P'_{rsvp\_Tx}}$. Where, |
| |       q = 1, 2, . . . , Q, where, |
| |       If $P_{rsvp\_RX} \leq T_{scal}$ and $n' - m < P'_{rsvp\_Rx} \Rightarrow Q = \left\lceil \frac{T_{scal}}{P_{rsvp\_RX}} \right\rceil$. |
| |       $T_{scal}$ is $T_2$ is units of milli-seconds. |
| |       Else Q = 1 |
| |       If n belongs to $(t'_0{}^{SL}, t'_1{}^{SL}, \ldots, t'_{T'_{max}-1}{}^{SL})$. n' = n. else n' is the first slot after slot n belonging to set $(t'_0{}^{SL}, t'_1{}^{SL}, \ldots, t'_{T'_{max}-1}{}^{SL})$. |
| |       j = 0, 1, . . . , $C_{resel}$ − 1 |
| |       $P_{rsvp\_RX}$ is the indicated resource reservation period in the received SCI in physical slots, and $P'_{rsvp\_Rx}$ is that value converted to logical slots. $P'_{rsvp\_Tx}$ is the resource reservation period of the SL transmissions for which resources are being reserved in logical slots. |
| 3. | If the candidate resources are less than a (pre-)configured percentage, such as 20% of the total available resources within the resource selection window, the (pre-)configured SL-RSRP thresholds are increased by a predetermined amount, such as 3 dB. | such that $T_{2min} \leq T_2 \leq$ Remaining Packet Delay Budget, as long as $T_{2min} <$ Remaining Packet Delay Budget, else $T_2$ is equal to the Remaining Packet Delay Budget. $T_{2min}$ is configured by higher layers and depends on the priority of the SL transmission.

The resource (re-)selection is a two-step procedure: (1) the first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot $m-T_3$.

The re-evaluation check includes: (1) performing the first step of the SL resource selection procedure (as illustrated in 3GPP standard specification 38.214), which involves identifying a candidate (e.g., available) sidelink resource set in a resource selection window as previously described; (2) if the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

A pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot $m-T_3$.

When pre-emption check is enabled by higher layers, a pre-emption check includes: (1) performing the first step of the SL resource selection procedure (as illustrated in 3GPP standard specification 38.214), which involves identifying candidate (available) sidelink resource set in a resource selection window as previously described; (2) if the pre-selected and reserved resource is available in the candidate sidelink resource set, the resource is used/signaled for side-link transmission; and (3) else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$.

If the priority value $P_{RX}$ is less than a higher-layer configured threshold and the priority value $P_{RX}$ is less than the priority value $P_{TX}$. The pre-selected and reserved side-link resource is pre-empted. A new sidelink resource is re-selected from the candidate sidelink resource set. Note that, a lower priority value indicates traffic of higher priority. Else, the resource is used/signaled for sidelink transmission.

The positioning solutions provided for release 16 target the following commercial requirements for commercial applications as shown in TABLE 3.

TABLE 3

| Requirement characteristic | Requirement target |
|---|---|
| Horizontal Positioning Error | Indoor: 3 m for 80% of the UEs<br>Outdoor: 10 m for 80% of the UEs |
| Vertical Positioning Error | Indoor: 3 m for 80% of the UEs<br>Outdoor: 3 m for 80% of the UEs |
| End to end latency | Less than 1 second |

To meet these requirements, radio access technology (RAT)-dependent, RAT independent, and a combination of RAT-dependent and RAT independent positioning schemes have been considered. For the RAT-dependent positioning schemes, timing based positioning schemes as well as angle-based positioning schemes have been considered. For timing based positioning schemes, NR supports DL time difference of arrival (DL-TDOA), using positioning reference signals (PRS) for time of arrival measurements. NR also supports UL time difference of arrival (UL-TDOA), using sounding reference signals (SRS) for time of arrival measurements.

NR also supports round-trip time (RTT) with one or more neighboring gNBs or transmission/reception points (TRPs). For angle based positioning schemes, NR exploits the beam-based air interface, supporting downlink angle of departure (DL-AoD), as well as uplink angle of arrival (UL-AoA). Furthermore, NR supports enhanced cell-ID (E-CID) based positioning schemes. RAT independent positioning schemes can be based on global navigation satellite systems (GNSS), WLAN (e.g., WiFi), Bluetooth, terrestrial beacon system (TBS), as well as sensors within the UE such as accelerometers, gyroscopes, magnetometers, etc. Some of the UE sensors are also known as inertial measurement unit (IMU).

As NR expands into new verticals, there is a need to provide improved and enhanced location capabilities to meet various regulatory and commercial positioning requirements. 3GPP SA1 considered the service requirements for high accuracy positioning in TS 22.261 and identified seven service levels for positioning, with varying levels of accuracy (horizontal accuracy and vertical accuracy), positioning availability, latency requirement, as well as positioning type (absolute or relative).

One of the positioning service levels is relative positioning (as illustrated in 3GPP standard specification TS 22.261), with a horizontal and vertical accuracy of 0.2 m, availability of 99%, latency of 1 sec, and targeting indoor and outdoor environments with speed up to 30 km/hr and distance between UEs or a UE and a 5G positioning node of 10 m.

Rel-17 further enhanced the accuracy, latency, reliability and efficiency of positioning schemes for commercial and IIOT applications. Targeting to achieve sub-meter accuracy with a target latency less than 100 ms for commercial applications, and accuracy better than 20 cm with a target latency in the order of 10 ms for IIOT applications.

In Rel-17, RAN undertook a study item for in-coverage, partial coverage and out-of-coverage NR positioning use cases [RP-201518]. The study focused on identifying positioning use cases and requirements for V2X and public safety as well as identifying potential deployment and operation scenarios. The outcome of the study item is included in TR 38.845.

V2X positioning requirements depend on the service the UE operates, and are applicable to absolute and relative positioning. Use cases include indoor, outdoor and tunnel areas, within network coverage or out of network coverage; as well as with GNSS-based positioning available, or not available, or not accurate enough; and with UE speeds up to 250 km/h. There are three sets of requirements for V2X use cases; the first with horizontal accuracy in the 10 to 50 m range, the second with horizontal accuracy in the 1 to 3 m range, and the third with horizontal accuracy in the 0.1 to 0.5 m range. The 5G system can also support determining the velocity of a UE with a speed accuracy better than 0.5 m/s and a 3-dimension direction accuracy better than 5 degrees. Public safety positioning is to support indoor and outdoor use cases, with in network coverage or out of network coverage; as well as with GNSS-based positioning available, or not available, or not accurate enough. Public safety positioning use cases target a 1-meter horizontal accuracy and a vertical accuracy of 2 m (absolute) or 0.3 m (relative).

In terms of deployment and operation scenarios for in-coverage, partial-coverage and out-of-coverage NR positioning use cases, 3GPP standard specification TR 38.845 has identified the following: (1) for network coverage, in-network coverage, partial network coverage as well as out-of-network coverage. In addition to scenarios with no GNSS and no network coverage; (2) radio link, Uu interface (UL/DL interface) based solutions, PC5 interface (SL interface) based solutions and their combinations (hybrid solutions). As well as RAT-independent solutions such as GNSS and sensors; (3) positioning calculation entity, network-based positioning when the positioning estimation is performed by the network and UE-based positioning when the positioning estimation is performed by the UE; (4) a UE type, for V2X UEs, this can be a UE installed in a vehicle, a road-side unit (RSU), or a vulnerable road user (VRU). Some UEs can have distributed antennas, e.g., multiple antenna patterns that can be leveraged for positioning. UEs can have different power supply limitations, for example VRUs or handheld UEs have limited energy supply compared to other UEs; and (5) spectrum, this can include licensed spectrum and unlicensed spectrum for the Uu interface and the PC5 interface; as well as ITS-dedicated spectrum for the PC5 interface.

SL is one of the promising features of NR, targeting verticals such the automotive industry, public safety, industrial internet of things (IIoT) and other commercial application. 3GPP Rel-16 is the first NR release to include sidelink through work item "5G V2X with NR sidelink" with emphasis on V2X and public safety where the requirements are met. In Rel-17, the support of SL has been expanded to other types of UEs such vulnerable road users (VRUs), pedestrian UEs (PUEs) and other types of handheld devices, by supporting mechanisms for power saving for SL resource allocation as well as mechanisms that enhance reliability and reduce latency of SL transmissions.

Another feature that NR supports is positioning, using the NR radio interface for performing positioning measurements to determine or assist in determining the location of a UE. NR positioning was first introduced using the Uu interface in Rel-16, through work item "NR Positioning Support." Rel-17 further enhanced accuracy and reduced the latency of NR-based positioning through work item "NR Positioning Enhancements." In Rel-17, a study was conducted in the RAN on "scenarios and requirements of in-coverage, partial coverage, and out-of-coverage positioning use cases" with accuracy requirements in the 10's of cm range, using the PC5 interface as well as the Uu interface for absolute and relative positioning. In Rel-18 a new study item has been approved to study and evaluate performance and feasibility of potential solutions for SL positioning.

In the present disclosure, aspects related to measuring the round-trip-time (RTT) on the SL interface is provided with and without UE mobility. In addition, UEs with multiple antennas (multiple panels) to assist in relative positioning between UEs are provided.

The present disclosure relates to a 5G/NR communication system.

The present disclosure provides measurements and procedures for measuring the round-trip-time (RTT) in the SL interface including: (1) taking in consideration the mobility of the UE; and (2) the use of multiple antennas (panels) to assist in relative positioning.

In the following examples, time can be expressed in one of following: (1) logical slots within a resource pool: (i) a logical slot index for a slot within a resource pool is denoted as $t'^{SL}_i$; and (ii) a time period expressed in logical slots within a resource pool is denoted as T'; (2) logical slots that can be in a resource pool. These are the SL slots before the application of the resource pool bitmap, as described in 3GPP standard specification TS 38.214: (i) a logical slot index for a slot that can be in a resource pool is denoted as $t^{SL}_i$; and (ii) a time period expressed in logical slots that can be in a resource pool is denoted as T. While this is the same notation as used for logical slots within a resource pool the value is different, and it should be apparent from the context which value to use; and (3) physical slots or physical time: (i) a physical slot number (or index) is denoted as n or n'. n is the physical slot number of any physical slot, while n' is the physical slot number of a slot in the resource pool; and (ii) a time period is expressed as physical time (e.g., in milliseconds (ms)) or in units of physical slots.

When used in the same equation, time units may be the same, i.e.: (1) if logical slots within a resource pool are used in an equation, inequality or expression, the time period in the same equation, inequality or expression should be expressed in units of logical slots within a resource pool; (2) if logical slots that can be in a resource pool are used in an equation, inequality or expression, the time period in the same equation, inequality or expression should be expressed in units of logical slots that can be in a resource pool; and (3) if physical slots are used in an equation, inequality or expression, the time period in the same equation, inequality or expression should be expressed in units of physical slots or physical time scaled by the slot duration.

Time units can be converted from one unit to another.

For example, for each logical slot index for a slot within a resource pool there is a corresponding physical slot number. The converse is not true, i.e., not every physical slot corresponds to a logical slot within a resource pool. When converting from physical slot number to logical slot index: (1) if the physical slot is in the resource pool, the corresponding logical slot index within the resource pool is determined; and (2) if the physical slot is not in the resource pool, the index of an adjacent logical slot within the resource pool is determined, wherein one of: (i) the adjacent logical slot is the next logical slot after the physical slot; and (ii) the adjacent logical slot is the pervious logical slot before the physical slot.

To convert from physical time (in ms) to time in units of logical slots within a resource pool, the following equation can be used, wherein T is in units of ms and T' is in units of logical slots within a resource pool:

$$T' = \left\lceil \frac{T'_{max}}{10240 \text{ ms}} \times T \right\rceil$$

where $T'_{max}$ is the number of logical slots within the resource pool in 1024 frames or 10240 ms.

The slot index or the time period provided by higher layers or specified in the specifications can be given in one unit, e.g., in physical slots or in ms, and is converted to a logical slot index or units of logical slots within a resource pool before being used in the corresponding equations, or vice versa.

In the present disclosure, a SL positioning reference signal refers generically to a physical reference signal transmitted on the SL interface to assist in determining a position of a SL UE based on measurements performed on the SL positioning reference signal. In one example, a SL positioning reference signal can have a physical signal structure and/or resource allocation similar to the physical signal structure and/or resource allocation of a DL positioning reference signal (PRS) used in DL of the Uu interface in NR, except that it is transmitted/received on the SL interface (PC5 interface).

In another example, a SL positioning reference signal can have a physical signal structure and/or resource allocation similar to the physical signal structure and/or resource allocation of a UL positioning sounding reference signal (SRS) used in UL of the Uu interface in NR, except that it is transmitted/received on the SL interface (PC5 interface). In another example, a SL positioning reference signal can have a physical signal structure and/or resource allocation combining aspects of the physical signal structure and/or resource allocation of (1) DL positioning reference signal (PRS) used in DL of the Uu interface in NR and (2) UL positioning sounding reference signal (SRS) used in UL of the Uu interface in NR, except that it is transmitted/received on the SL interface (PC5 interface). In another example, a SL positioning reference signal can have a new physical signal structure and/or resource allocation for use on the SL interface (PC5 interface).

As described in the U.S. patent application Ser. No. 18/183,037, which is incorporated by reference in its entirety, a reference signal used for positioning can be pre-configured and/or configured and/or allocated a network and/or by a SL UE.

In one embodiment, the network can configure SL resources for SL positioning reference signal and/or SL resources for reporting SL measurements. The network can further configure SL UEs to transmit and/or receive SL positioning reference signals. The network can further configure SL UEs to perform SL positioning measurements.

Figure 7:
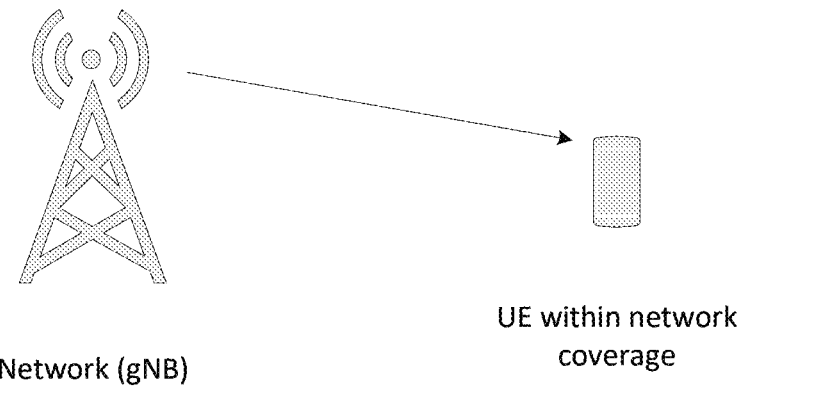
FIG. 7 illustrates an example of network coverage for a UE according to embodiments of the present disclosure.

FIG. 7 illustrates an example of network coverage for a UE 700 according to embodiments of the present disclosure. The embodiment of the network coverage for a UE 700 illustrated in FIG. 7 is for illustration only.

A UE is in coverage of a network as shown in FIG. 7. The network can configure the UE with resources to use for: (1) SL positioning reference signals on the SL interface (PC5 interface); and/or (2) reporting of SL positioning measurements on the SL interface (PC5 interface).

In another embodiment, a SL UE is (pre-)configured SL resources for SL positioning reference signal and/or SL resources for reporting SL measurements. The UE can be further configured to transmit and/or receive SL positioning reference signals. The UE can be further configured to perform SL positioning measurements.

The UE can be configured with resources to use for: (1) SL positioning reference signals on the SL interface (PC5 interface); and/or (2) reporting of SL positioning measurements on the SL interface (PC5 interface).

SL positioning reference signals are reference signals transmitted on the SL interface by a first UE. The SL positioning reference signals are received by one or more second UE(s) (e.g., the SL PRS can be unicast or groupcast or broadcast from a first UE to one or more second UEs), wherein the second UE(s) performs SL positioning measurements on the SL positioning reference signals. SL positioning measurements are measurements that aid in finding the position of a SL UE, e.g., the absolute position of the first SL UE and/or the absolute position of the second SL UE, and/or the relative of position of the first SL UE to the second SL UE and/or the relative position of the second SL UE to the first SL UE. Absolute position is defined in a frame of reference, e.g., the global frame of reference (e.g., using latitude and longitude and/or elevation).

SL positioning measurements can include: (1) SL reference signal time difference (RSTD). For example, the time difference between a positioning reference signal received by a SL UE and a reference time; (2) SL reference signal received power (RSRP) of a SL positioning reference signal; (3) SL reference signal received path power (RSRPP) of a SL positioning reference signal; (4) SL angle of arrival (AoA) of a SL positioning reference signal; and (5) SL Rx–Tx time difference. For example, this can be the difference between the receive time of a first SL positioning reference signal and the transmit time of a second SL positioning reference signal.

A first UE is configured with a positioning reference signal on the SL interface (e.g., SL positioning reference signal referred to as SL PRS in this disclosure).

The configuration of the SL PRS can include: (1) time domain resources, e.g., number of symbols and starting position (e.g., starting symbol) within a slot of DL PRS; (2)

time domain behavior, whether transmission is aperiodic, semi-persistent or periodic transmission, including periodicity for semi-persistent and periodic transmissions; (3) frequency domain resources, e.g., starting position in frequency domain (e.g., FD shift), and length in frequency domain (e.g., number of PRBs or C-SRS); (4) transmission comb related information. Number of transmission combs and transmission comb offset; and (5) code domain information, e.g., sequence ID, and group or sequence hopping type (e.g., groupHopping, or sequenceHopping or neither).

The first UE transmits the SL positioning reference signal in slot m1.

A second UE receives the SL positioning reference signal in slot m1 at time $T_{m1\text{-}Rx}^{UE2}$. $T_{m1\text{-}Rx}^{UE2}$ is the second UE received timing of SL slot m1 from the first UE, defined by e.g., the first detected path in time.

The time for transmission from the second UE in slot n1 is $T_{n1\text{-}Tx}^{UE2}$. $T_{n1\text{-}Tx}^{UE2}$ the second UE transmit timing of SL slot n1 corresponding to (e.g., closest in time to slot m1 received from the first UE). In one example m1=n1.

The second UE calculates the UE Rx–Tx time difference in slot m1 as $T_{Rx\text{-}Tx}^{UE2}(m1)=T_{m1\text{-}Rx}^{UE2}-T_{n1\text{-}Tx}^{UE2}$, or $T_{Rx\text{-}Tx}^{UE2}(m1)=T_{m1\text{-}Rx}^{UE2}-T_{m1\text{-}Tx}^{UE2}$, if m1=n1.

In one example, slot m1 can be replaced by sub-frame m1 or frame m1 or SFN m1 or symbol m1 and correspondingly, slot n1 can be replaced by sub-frame n1 or frame n1 or SFN n1 or symbol n1.

The second UE is configured with a positioning reference signal on the SL interface (e.g., SL positioning reference signal).

The configuration of the SL PRS can include: (1) time domain resources, e.g., number of symbols and starting position (e.g., starting symbol) within a slot of DL PRS; (2) time domain behavior, whether transmission is aperiodic, semi-persistent or periodic transmission, including periodicity for semi-persistent and periodic transmissions; (3) frequency domain resources, e.g., starting position in frequency domain (e.g., FD shift), and length in frequency domain (e.g., number of PRBs or C-SRS); (4) transmission comb related information. Number of transmission combs and transmission comb offset; and (5) code domain information, e.g., sequence ID, and group or sequence hopping type (e.g., groupHopping, or sequenceHopping or neither).

Some of the aforementioned parameters can be common for the first UE and the second UE, e.g., configured with a common configuration, and some can be distinct, e.g., specific for each UE.

The second UE transmits the SL positioning reference signal in slot n2.

The first UE receives the SL positioning reference signal in slot n2 at time $T_{n2\text{-}Rx}^{UE1}$. $T_{n2\text{-}Rx}^{UE1}$ is the first UE received timing of SL slot n2 from the second UE, defined by, e.g., the first detected path in time.

The time for transmission from the first UE in slot m2 is $T_{m2\text{-}Tx}^{UE1}$. $T_{m2\text{-}Tx}^{UE1}$ is the first UE transmit timing of SL slot m2 corresponding to (e.g., closest in time to slot n2 received from the second UE). In one example m2=n2.

The first UE calculates the UE Rx–Tx time difference in slot n2 as $T_{Rx\text{-}Tx}^{UE1}(n2)=T_{n2\text{-}Rx}^{UE1}-T_{m2\text{-}Tx}^{UE1}$, or $T_{Rx\text{-}Tx}^{UE1}(n2)=T_{n2\text{-}Rx}^{UE1}-T_{n2\text{-}Tx}^{UE1}$, if m2=n2.

In one example, slot n2 can be replaced by sub-frame n2 or frame n2 or SFN n2 or symbol n2 and correspondingly, slot m2 can be replaced by sub-frame m2 or frame m2 or SFN m2 or symbol m2.

Figure 8:
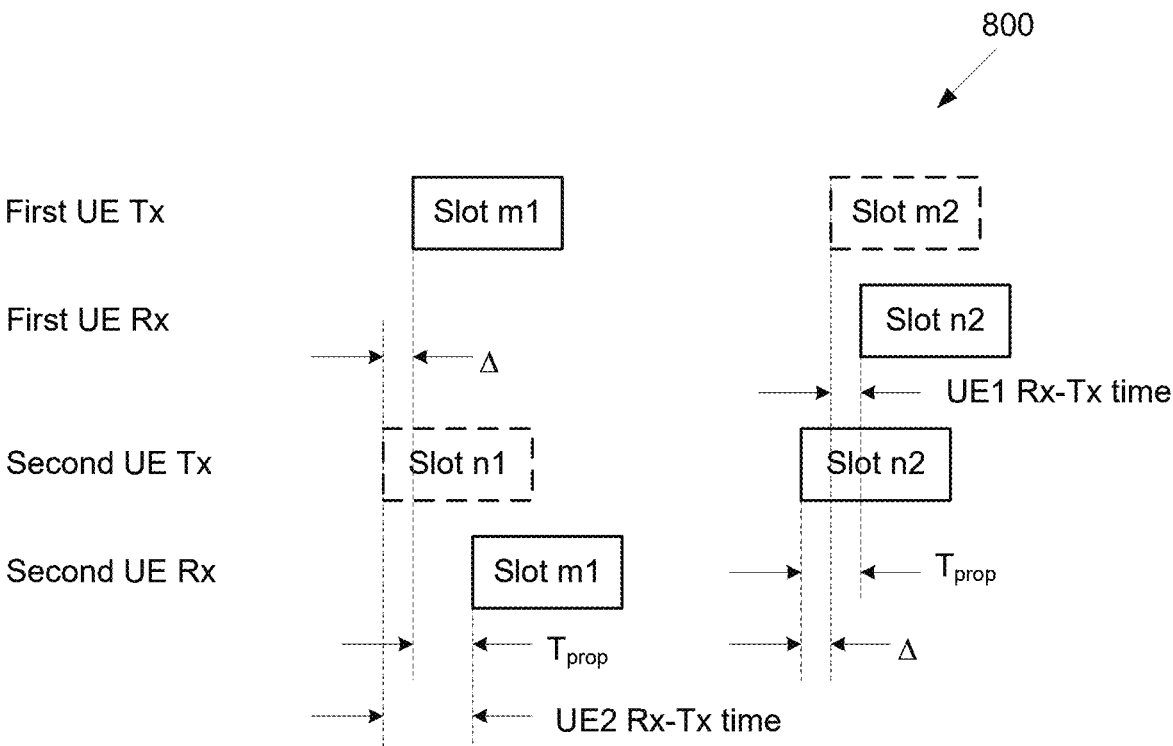
FIG. 8 illustrates an example of timing difference according to embodiments of the present disclosure.

FIG. 8 illustrates an example of timing difference 800 according to embodiments of the present disclosure. The embodiment of the timing difference 800 illustrated in FIG. 8 is for illustration only.

As illustrated in FIG. 8, if the difference in timing between slot m1 at the first UE and corresponding slot n1 at the second UE is Δ. The difference in timing between slot m2 at the first UE and corresponding slot n2 at the second UE is also Δ, e.g., no drift in UE timing relative to each other. The one way propagation delay in slot m1 is $T_{prop}$. The one way propagation delay in slot n2 is also $T_{prop}$, e.g., there is no relative motion between the two UEs (or every slow motion such that the propagation delay is almost the same in slots m1 and n2).

Therefore, in slot m1, $T_{prop}=T_{Rx\text{-}Tx}^{UE2}$(m1)−Δ. In slot n2, $T_{prop}=T_{Rx\text{-}Tx}^{UE1}$(n2)+Δ. Adding the two equations, it may get: round trip time=2·$T_{prop}=T_{Rx\text{-}Tx}^{UE2}$(m1)+$T_{Rx\text{-}Tx}^{UE1}$(n2). Therefore, propagation delay=½($T_{Rx\text{-}Tx}^{UE2}$(m1)+$T_{Rx\text{-}Tx}^{UE1}$(n2)).

Figure 9:
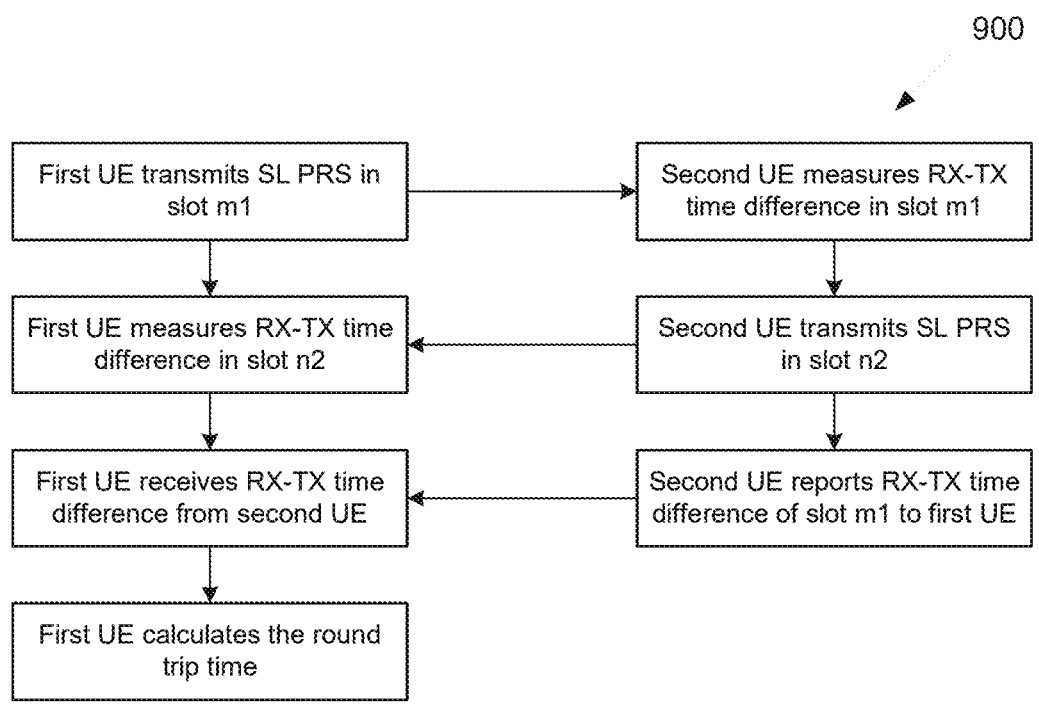
FIGS. 9 to 11 illustrate examples of UE measurement operation according to embodiments of the present disclosure.
Figure 10:
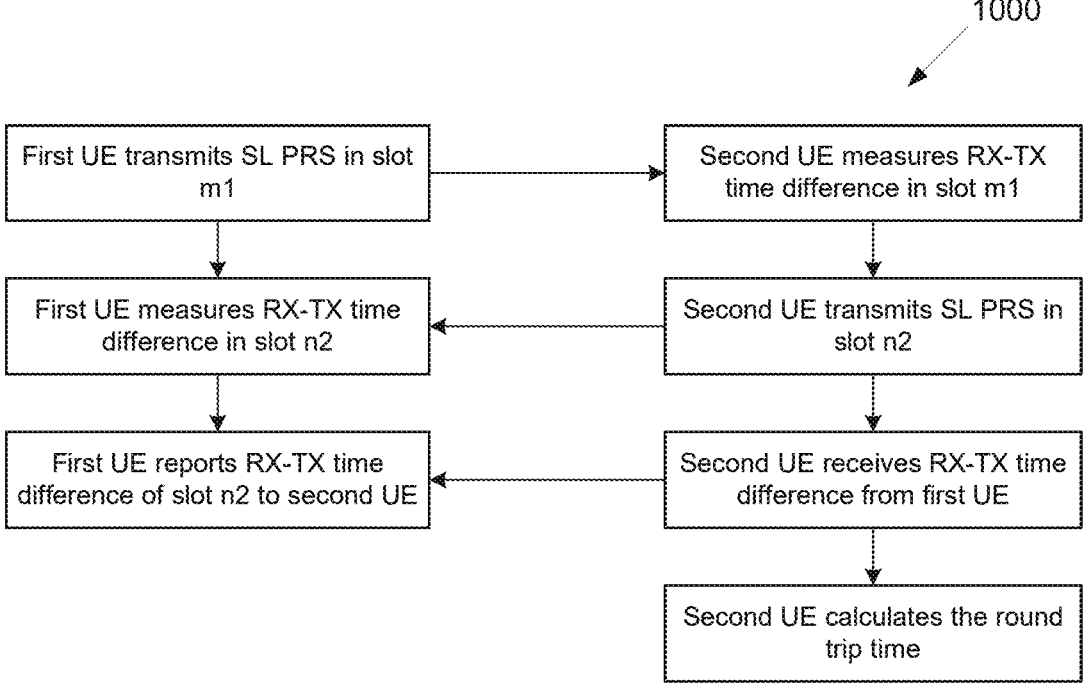
Figure 11:
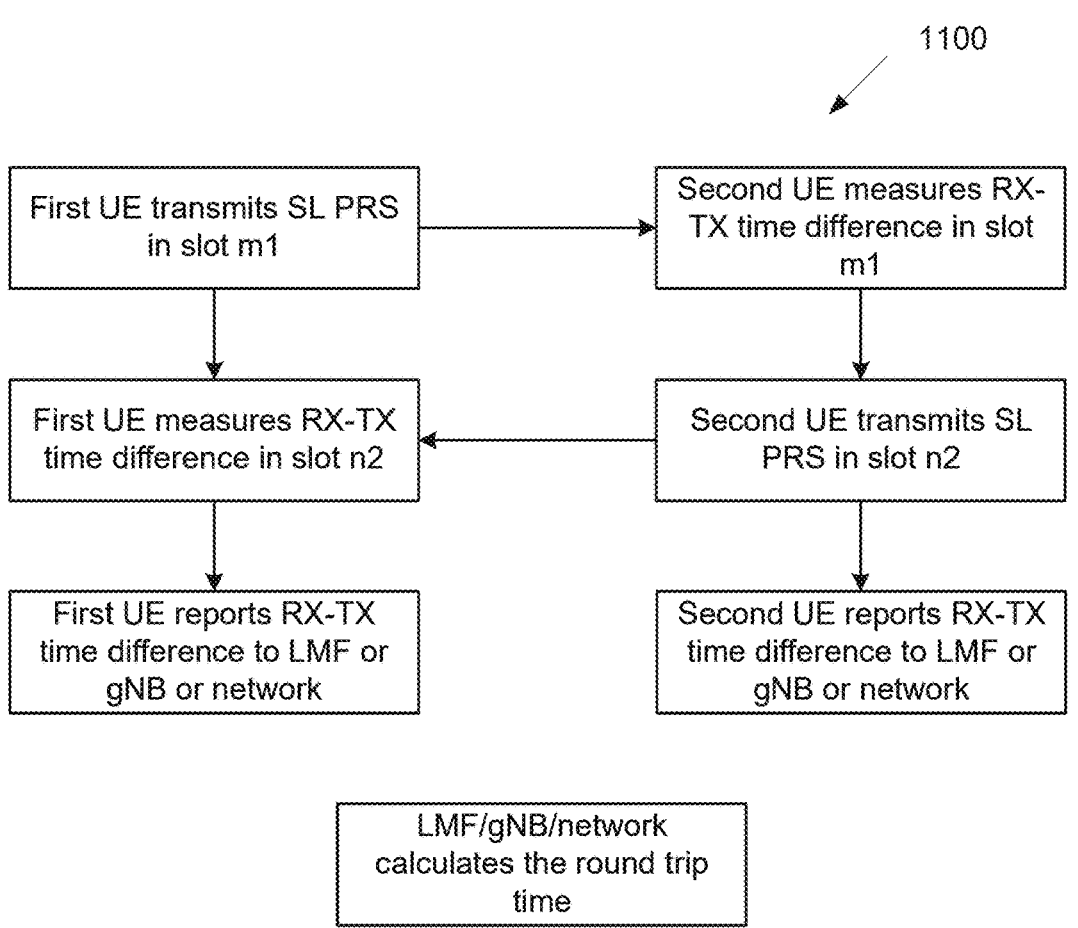

FIGS. 9 to 11 illustrate examples of UE measurement operation 900 to 1100 according to embodiments of the present disclosure. The embodiment of the UE measurement operation 900 to 1100 illustrated in FIGS. 9 to 11 are for illustration only.

In one example, illustrated in FIG. 9, the second UE provides the first UE, the measured Rx−Tx time difference at the second UE, i.e., $T_{Rx\text{-}Tx}^{UE2}$(m1). The first UE measures $T_{Rx\text{-}Tx}^{UE1}$(n2). The propagation time between the first UE and the second UE can be calculated as: propagation delay=½($T_{Rx\text{-}Tx}^{UE2}$(m1)+$T_{Rx\text{-}Tx}^{UE1}$(n2)).

In one example as illustrated in FIG. 10, the first UE provides the second UE, the measured Rx−Tx time difference at the first UE, i.e., $T_{Rx\text{-}Tx}^{UE1}$(n2). The second UE measures $T_{Rx\text{-}Tx}^{UE2}$(m1). The propagation time between the first UE and the second UE can be calculated as:

$$\text{Propagation delay} = \frac{1}{2}\left(T_{Rx\text{-}Tx}^{UE2}(m1) + T_{Rx\text{-}Tx}^{UE1}(n2)\right).$$

In one example as illustrated in FIG. 11, the first UE provides an LMF or a gNB (e.g., network), the measured Rx−Tx time difference at the first UE, i.e., $T_{Rx\text{-}Tx}^{UE1}$(n2). The second UE provides an LMF or a gNB (e.g., network), the measured Rx−Tx time difference at the second UE, i.e., $T_{Rx\text{-}Tx}^{UE2}$(m1). The propagation time between the first UE and the second UE can be calculated at the LMF or the gNB (e.g., network) as: Propagation delay=½($T_{Rx\text{-}Tx}^{UE2}$+$T_{Rx\text{-}Tx}^{UE1}$(n2)).

In one example, Rx−Tx time difference at the first UE is measured at the same time the Rx−Tx time difference is measured at the second UE. For example, slot m2=m1 and slot n2=n1. In a further example, n1=m1, e.g., m1=n1=m2=n2. The measurement of the Rx−Tx time difference at the first UE and at the second UE at the same time can be to mitigate impact due to mobility of the UEs (e.g., the propagation time changes) or due to drift in synchronization between the two UEs.

Figure 12:
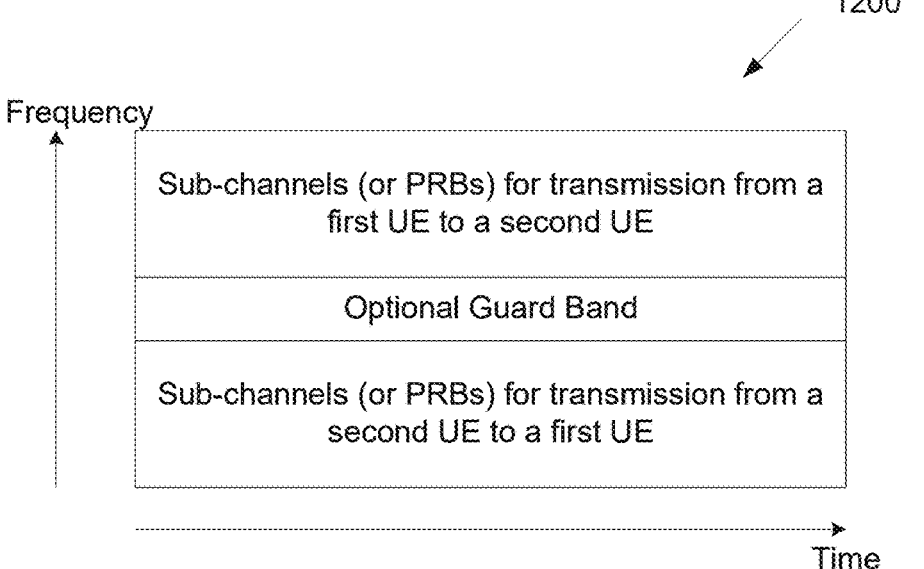
FIG. 12 illustrates examples of subchannel according to embodiments of the present disclosure.

FIG. 12 illustrates examples of subchannel 1200 according to embodiments of the present disclosure. The embodiment of the subchannel 1200 illustrated in FIG. 12 is for illustration only.

In one example, the transmission of the first SL PRS from the first UE to the second UE is on a subset of sub-channels (or PRBs) that can be used for transmission of SL from the first UE to the second UE in a slot. The transmission of the second SL PRS from the second UE to the first UE is on a subset of sub-channels that can be used for transmission of SL from the second UE to the first UE in a slot as illustrated in FIG. 12. The usage of some sub-channels for transmission from the first UE to the second UE and other sub-channels for transmission from a second UE to a first UE in a slot can be (pre-) configuration. The usage of some sub-channels for transmission from the first UE to the second UE and other sub-channels for transmission from a second UE to a first UE in a slot can depend on a UE capability, i.e., a UE is capable of transmission and reception in a same slot. There can be an optional guard band between the sub-channels for transmission from the first UE to the second UE and the sub-channels for transmission from the second UE to the first UE.

In one example, the allocation of sub-channels can change from one slot to the next. For example, in some slots sub-channels are allocated as aforementioned. In other slots there is no allocation for transmission or reception, a UE can decide to transmit if it has channels or signals to transmit.

In one example, the transmission of the first SL PRS from the first UE to the second UE is in one BWP. The transmission of the second SL PRS from the second UE to the first UE is in a second BWP. The transmission/reception in each BWP can be decide independently. The support of multiple BWPs (e.g., two BWPs) with transmission and reception in the different BWPs at the same time can depend on a UE capability. One BWP can be used to transmit SL PRS from a first UE to a second UE, while a second BWP can be used to transmit SL PRS from a second UE to a first UE at the same time (or at different times).

In one example, the numerology (sub-carrier spacing) is the same in the multiple (e.g., two) BWPs.

In one example, the numerology (sub-carrier spacing) can be different in the multiple (e.g., two) BWPs. In one example, the start of the slots (or symbols) used for transmission of SL PRS from the first UE to the second UE and from the second UE to the first UE are aligned or as closely aligned as possible in each BWP.

In one example, the transmission of the first SL PRS from the first UE to the second UE is in one carrier. The transmission of the second SL PRS from the second UE to the first UE is in a second carrier. The transmission/reception in each carrier can be decide independently. The support of multiple carriers (e.g., two carriers) with transmission and reception in the different carriers at the same time can depend on a UE capability. One carrier can be used to transmit SL PRS from a first UE to a second UE, while a second carrier can be used to transmit SL PRS from a second UE to a first UE at the same time (or at different times).

In one example, the numerology (sub-carrier spacing) is the same in the multiple (e.g., two) carriers.

In one example, the numerology (sub-carrier spacing) can be different in the multiple (e.g., two) carriers. In one example, the start of the slots (or symbols) used for transmission of SL PRS from the first UE to the second UE and from the second UE to the first UE are aligned or as closely aligned as possible in each carrier.

In one example, the carriers are in the same frequency band.

In one example, the carriers are in different frequency bands.

In one example, the carriers can be in the same or in different frequency bands.

In one example, the carriers are in the same frequency range (e.g., FR1, FR2, FR2-1, and FR2-2).

In one example, the carriers are in different frequency ranges (e.g., FR1, FR2, FR2-1, and FR2-2).

In one example, the carriers can be in the same or in different frequency ranges (e.g., FR1, FR2, FR2-1, and FR2-2).

In one example, the transmission of the first SL PRS from the first UE to the second UE is in one band. The transmission of the second SL PRS from the second UE to the first UE is in a second band. The transmission/reception in each band can be decide independently. The support of multiple bands (e.g., two bands) with transmission and reception in the different bands at the same time can depend on a UE capability. One band can be used to transmit SL PRS from a first UE to a second UE, while a second band can be used to transmit SL PRS from a second UE to a first UE at the same time (or at different times).

In one example, the numerology (sub-carrier spacing) is the same in the multiple (e.g., two) bands.

In one example, the numerology (sub-carrier spacing) can be different in the multiple (e.g., two) bands. In one example, the start of the slots (or symbols) used for transmission of SL PRS from the first UE to the second UE and from the second UE to the first UE are aligned or as closely aligned as possible in each band.

In one example, the bands are in the same frequency range (e.g., FR1, FR2, FR2-1, and FR2-2).

In one example, the bands are in different frequency ranges (e.g., FR1, FR2, FR2-1, and FR2-2).

In one example, the bands can be in the same or in different frequency ranges (e.g., FR1, FR2, FR2-1, and FR2-2).

In one example, the measurement of the UE Rx–Tx time difference is performed in multiple slots and averaged to mitigate the impact of mobility.

A first UE is configured with a positioning reference signal on the SL interface (e.g., SL positioning reference signal referred to as SL PRS in this disclosure).

The configuration of the SL PRS can include: (1) time domain resources, e.g., number of symbols and starting position (e.g., starting symbol) within a slot of DL PRS; (2) time domain behavior, whether transmission is aperiodic, semi-persistent or periodic transmission, including periodicity for semi-persistent and periodic transmissions; (3) frequency domain resources, e.g., starting position in frequency domain (e.g., FD shift), and length in frequency domain (e.g., number of PRBs or C-SRS); (4) transmission comb related information. Number of transmission combs and transmission comb offset; and (5) code domain information, e.g., sequence ID, and group or sequence hopping type (e.g., groupHopping, or sequenceHopping or neither).

The first UE transmits the SL positioning reference signal in slot m1.

A second UE receives the SL positioning reference signal in slot m1 at time $T_{m1-Rx}^{UE2}$. $T_{m1-Rx}^{UE2}$ is the second UE receive timing of SL slot m1 from the first UE, defined by e.g., the first detected path in time.

The time for transmission from the second UE in slot n1 is $T_{n1-Tx}^{UE2}$. $T_{n1-Tx}^{UE2}$ is the second UE transmit timing of SL slot n1 corresponding to (e.g., closest in time to slot m1 received from the first UE). In one example m1=n1.

The second UE calculates the UE Rx–Tx time difference in slot m1 as $T_{Rx-Tx}^{UE2}(m1)=T_{m1-Rx}^{UE2}-T_{n1-Tx}^{UE2}$, or $T_{Rx-Tx}^{UE2}(m1)=T_{m1-Rx}^{UE2}-T_{m1-Tx}^{UE2}$, if m1=n1.

In one example, slot m1 can be replaced by sub-frame m1 or frame m1 or SFN m1 or symbol m1 and correspondingly, slot n1 can be replaced by sub-frame n1 or frame n1 or SFN n1 or symbol n1.

The first UE transmits the SL positioning reference signal in slot m3.

A second UE receives the SL positioning reference signal in slot m3 at time $T_{m3-Rx}^{UE2}$. $T_{m3-Rx}^{UE2}$ is the second UE received timing of SL slot m3 from the first UE, defined by, e.g., the first detected path in time.

The time for transmission from the second UE in slot n3 is $T_{n3-Tx}^{UE2}$. $T_{n3-Tx}^{UE2}$ is the second UE transmit timing of SL slot n3 corresponding to (e.g., closest in time to slot m3 received from the first UE). In one example m3=n3.

The second UE calculates the UE Rx–Tx time difference in slot m3 as $T_{Rx-Tx}^{UE2}(m3)=T_{m3-Rx}^{UE2}-T_{n3-Tx}^{UE2}$, or $T_{Rx-Tx}^{UE2}(m3)=T_{m3-Rx}^{UE2}-T_{m3-Rx}^{UE2}$, if m3=n3.

In one example, slot m3 can be replaced by sub-frame m3 or frame m3 or SFN m3 or symbol m3 and correspondingly, slot n3 can be replaced by sub-frame n3 or frame n3 or SFN n3 or symbol n3.

The second UE is configured with a positioning reference signal on the SL interface (e.g., SL positioning reference signal).

The configuration of the SL PRS can include: (1) time domain resources, e.g., number of symbols and starting position (e.g., starting symbol) within a slot of DL PRS; (2) time domain behavior, whether transmission is aperiodic, semi-persistent or periodic transmission, including periodicity for semi-persistent and periodic transmissions; (3) frequency domain resources, e.g., starting position in frequency domain (e.g., FD shift), and length in frequency domain (e.g., number of PRBs or C-SRS); (4) transmission comb related information. Number of transmission combs and transmission comb offset; and (5) code domain information, e.g., sequence ID, and group or sequence hopping type (e.g., groupHopping, or sequenceHopping, or neither).

Some of the aforementioned parameters can be common for the first UE and the second UE, e.g., configured with a common configuration, and some can be distinct, e.g., specific for each UE.

The second UE transmits the SL positioning reference signal in slot n2. In one example, n1<n2<n3.

The first UE receives the SL positioning reference signal in slot n2 at time $T_{n2-Rx}^{UE1}$. $T_{n2-Rx}^{UE1}$ is the first UE received timing of SL slot n2 from the second UE, defined by, e.g., the first detected path in time.

The time for transmission from the first UE in slot m2 is $T_{m2-Tx}^{UE1}$. In one example m1<m2<m3. $T_{m2-Tx}^{UE1}$ is the first UE transmit timing of SL slot m2 corresponding to (e.g., closest in time to slot n2 received from the second UE). In one example m2=n2.

The first UE calculates the UE Rx–Tx time difference in slot n2 as $T_{Rx-Tx}^{UE1}(n2)=T_{n2-Rx}^{UE1}-T_{m2-Tx}^{UE1}$, or $T_{Rx-Tx}^{UE1}(n2)=T_{n2-Rx}^{UE1}-T_{n2-Tx}^{UE1}$, if m2=n2.

In one example, slot n2 can be replaced by sub-frame n2 or frame n2 or SFN n2 or symbol n2 and correspondingly, slot m2 can be replaced by sub-frame m2 or frame m2 or SFN m2 or symbol m2.

Figure 13:
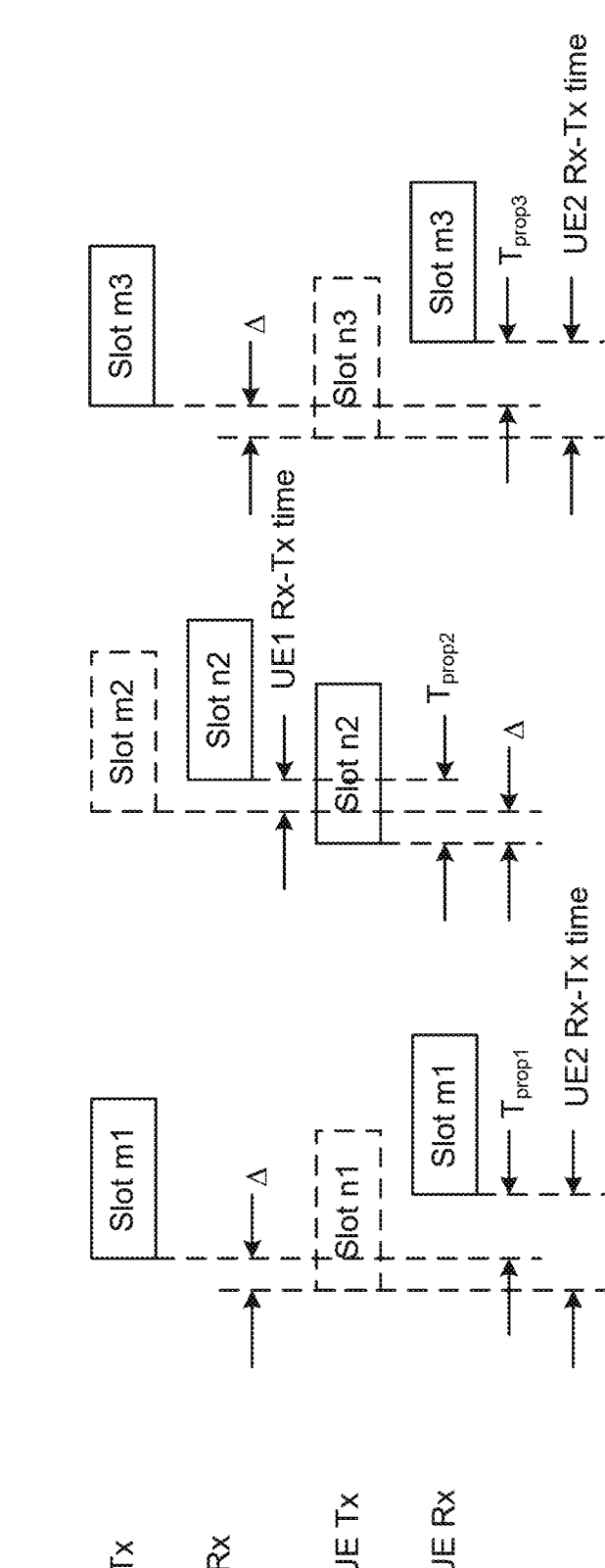
FIG. 13 illustrates an example of timing difference according to embodiments of the present disclosure.

FIG. 13 illustrates an example of timing difference 1300 according to embodiments of the present disclosure. The embodiment of the timing difference 1300 illustrated in FIG. 13 is for illustration only.

As illustrated in FIG. 13, if the difference in timing between slot m1 at the first UE and corresponding slot n1 at the second UE is Δ. The difference in timing between slot m2 at the first UE and corresponding slot n2 at the second UE is also Δ, e.g., no drift in UE timing relative to each other. The difference in timing between slot m3 at the first UE and corresponding slot n3 at the second UE is also Δ, e.g., no drift in UE timing relative to each other. The one way propagation delay in slot m1 is $T_{prop1}$. The one way propagation delay in slot n2 is $T_{prop2}$, e.g., this can be different from $T_{prop}1$, e.g., due to mobility. The one way propagation delay in slot m3 is $T_{prop3}$.

Therefore, in slot m1, $T_{prop1}=T_{Rx-Tx}^{UE2}(m1)-\Delta$. In slot n2, $T_{prop2}=T_{Rx-Tx}^{UE1}(n2)+\Delta$. In slot m3, $T_{prop3}=T_{Rx-Tx}^{UE2}(m3)-\Delta$.

Assuming that the speed is constant, it may estimate the measurement of $T'_{prop2}$ that the second UE may measure at slot m2 which corresponds to slot n2 as:

$$T'_{prop2} = \frac{m3-m2}{m3-m1}T_{prop1} + \frac{m2-m1}{m3-m1}T_{prop3} \text{ and}$$

$$T'_{prop2} = \frac{m3-m2}{m3-m1}T_{Rx-Tx}^{UE2}(m1) + \frac{m2-m1}{m3-m1}T_{Rx-Tx}^{UE2}(m3) - \Delta.$$

Adding the two equations for $T'_{prop2}$ and $T_{prop2}$, it may get:

Round trip time =

$$2 \cdot T_{prop} = \frac{m3-m2}{m3-m1}T_{Rx-Tx}^{UE2}(m1) + \frac{m2-m1}{m3-m1}T_{Rx-Tx}^{UE2}(m3) + T_{Rx-Tx}^{UE1}(n2).$$

Therefore,

Propagation delay =

$$\frac{1}{2}\left(\frac{m3-m2}{m3-m1}T_{Rx-Tx}^{UE2}(m1) + \frac{m2-m1}{m3-m1}T_{Rx-Tx}^{UE2}(m3) + T_{Rx-Tx}^{UE1}(n2)\right).$$

In one example, m2 is the midpoint between m1 and m3.

Figure 16:
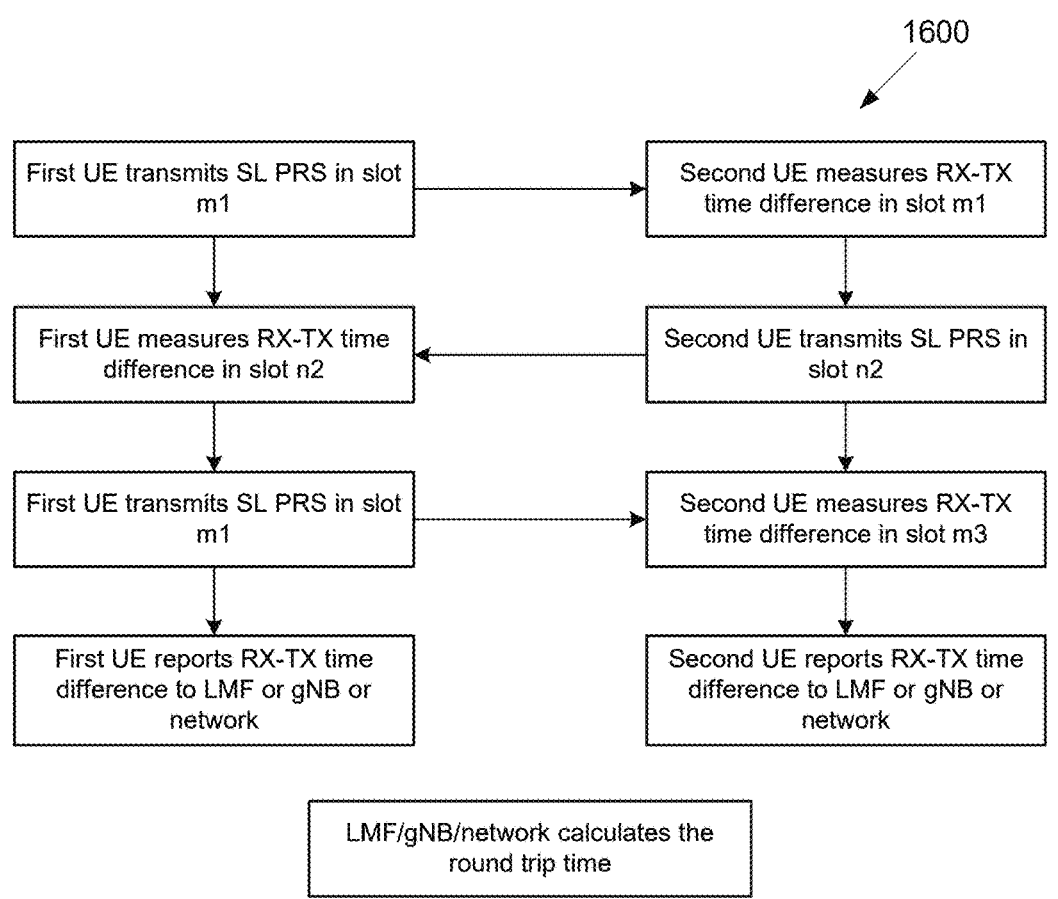

Therefore, $T'_{prop2} = \frac{1}{2}T_{Rx-Tx}^{UE2}(m1) + \frac{1}{2}T_{Rx-Tx}^{UE2}(m3) - \Delta,$ Round trip time $= 2 \cdot T_{prop} = \frac{1}{2}T_{Rx-Tx}^{UE2}(m1) + \frac{1}{2}T_{Rx-Tx}^{UE2}(m3) + \frac{1}{2}T_{Rx-Tx}^{UE2}(n2),$ and Propagation delay $= \frac{1}{2}\left(\frac{1}{2}T_{Rx-Tx}^{UE2}(m1) + \frac{1}{2}T_{Rx-Tx}^{UE2}(m3) + T_{Rx-Tx}^{UE1}(n2)\right).$ FIGS. 14 to 16 illustrate examples of UE measurement operation 1400 to 1600 according to embodiments of the present disclosure. The embodiment of the UE measurement operation 1400 to 1600 illustrated in FIGS. 14 to 16 are for illustration only.

In one example as illustrated in FIG. 14, the second UE provides the first UE, the measured Rx–Tx time difference at the second UE, i.e., $T_{Rx-Tx}^{UE2}(m1)$ and $T_{Rx-Tx}^{UE2}(m3)$. The first UE measures $T_{Rx-Tx}^{UE1}(n2)$. The propagation time between the first UE and the second UE can be calculated as:

Propagation delay =

$$\frac{1}{2}\left(\frac{m3-m2}{m3-m1}T_{Rx-Tx}^{UE2}(m1) + \frac{m2-m1}{m3-m1}T_{Rx-Tx}^{UE2}(m3) + T_{Rx-Tx}^{UE1}(n2)\right).$$

In one example as illustrated in FIG. 15, the first UE provides the second UE, the measured Rx–Tx time difference at the first UE, i.e., $T_{Rx-Tx}^{UE1}(n2)$. The second UE measures $T_{Rx-Tx}^{UE2}(m1)$ and $T_{Rx-Tx}^{UE2}(m3)$. The propagation time between the first UE and the second UE can be calculated as:

Propagation delay =

$$\frac{1}{2}\left(\frac{m3-m2}{m3-m1}T_{Rx-Tx}^{UE2}(m1) + \frac{m2-m1}{m3-m1}T_{Rx-Tx}^{UE2}(m3) + T_{Rx-Tx}^{UE1}(n2)\right).$$

In one example as illustrated in FIG. 16, the first UE provides an LMF or a gNB (network), the measured Rx–Tx time difference at the first UE, i.e., $T_{Rx-Tx}^{UE1}(n2)$. The second UE provides an LMF or a gNB (network), the measured Rx–Tx time difference at the second UE, i.e., $T_{Rx-Tx}^{UE2}(m1)$ and $T_{Rx-Tx}^{UE2}(m3)$. The propagation time between the first UE and the second UE can be calculated at the LMF or the gNB (e.g., network) as:

Propagation delay =

$$\frac{1}{2}\left(\frac{m3-m2}{m3-m1}T_{Rx-Tx}^{UE2}(m1) + \frac{m2-m1}{m3-m1}T_{Rx-Tx}^{UE2}(m3) + T_{Rx-Tx}^{UE1}(n2)\right).$$

Figure 17:
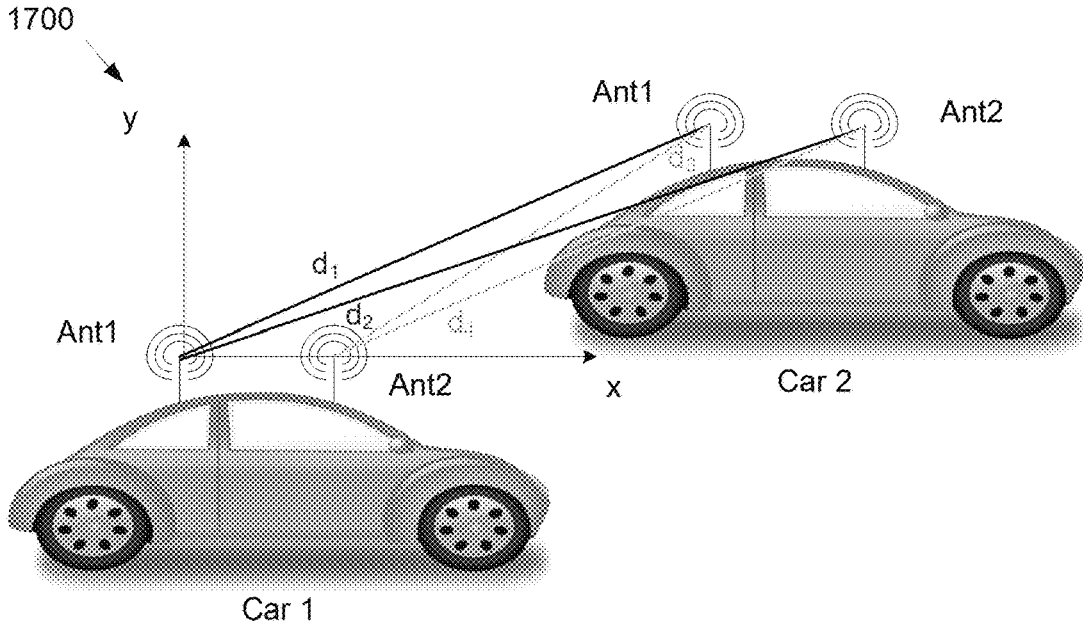
FIG. 17 illustrates examples of multi-panel vehicular UEs for relative positioning according to embodiments of the present disclosure.

FIG. 17 illustrates examples of multi-panel vehicular UEs for relative positioning 1700 according to embodiments of the present disclosure. The embodiment of the multi-panel vehicular UEs for relative positioning 1700 illustrated in FIG. 17 is for illustration only.

In one example, a UE can be configured with multiple antennas or multiple antenna panels. For example, a UE can have two antennas that are separated by a distance D. In one example, the UE can be a car or another device. In 3GPP standard specification TR 37.885 two options are defined for vehicular UE's antenna. Option 2 includes two antenna panels, with one being placed at the front bumper/roof top and one being placed at the rear bumper/roof top. By leveraging these antenna panels, it possible determine the relative position of two vehicles as illustrated in FIG. 17. By measuring the round-trip time between each pair of antennas in the two cars, car 1 can determine the relative position of car 2, using the aforementioned examples.

In one example, let the position of Ant1 of Car1 be (0,0), and let the position of Ant2 of Car1 be $(D_1, 0)$, where $D_1$ is the separation between Ant1 and Ant2 of Car1. The line joining the two antennas of Car1 is assumed to be the x-axis. Similarly, for Car2, let the position of Ant1 of Car2 be $(x_1, y_1)$, and let the position of Ant2 of Car1 be $(x_2, y_2)$. For Car2 the separation between the two antennas is $D_2$. Therefore $D_2^2=(x_2-x_1)^2+(y_2-y_1)^2$.

In one example, a first UE is configured with a positioning reference signal on the SL interface (e.g., SL PRS) to be transmitted from the first antenna of the first UE and from the second antenna of the first UE. The transmitted DL PRS from different antennas of the first UE (e.g., car1) are orthogonal.

The orthogonality of the resources can be in: (1) time domain, i.e., different TRPs or antenna panels transmit in different time intervals (e.g., different symbols or different slots or different subframes, or different frames . . . ); (2) frequency domain, i.e., different TRPs transmit in different frequency intervals (e.g., in different sub-carrier, or in different PRBs or using different comb shifts (e.g., comb offsets), . . . ), and/or (3) code domain, i.e., different TRPs transmit using sequences that are orthogonal or quasi-orthogonal to each other.

The configuration of the SL PRS can include (some or all of these parameters can be different for different antennas or antenna panels): (1) time domain resources, e.g., number of symbols and starting position (e.g., starting symbol) within a slot of DL PRS; (2) time domain behavior, whether transmission is aperiodic, semi-persistent or periodic transmission, including periodicity for semi-persistent and periodic transmissions; (3) frequency domain resources, e.g., starting position in frequency domain (e.g., FD shift), and length in frequency domain (e.g., number of PRBs or C-SRS); (4) transmission comb related information. Number of transmission combs and transmission comb offset; and (5) code domain information, e.g., sequence ID, and group or sequence hopping type (e.g., groupHopping, or sequence-Hopping or neither).

The first UE transmits a SL positioning reference signal in slot m1 for Ant1 and Ant2. Alternatively, the first UE transmits a first SL positioning reference signal in slot m1 from Ant1 and a second SL positioning reference signal in slot m'1 from Ant2.

A second UE receives the SL positioning reference signal in slot m1 at time $T_{m1-Rx}^{UE2-11}$ on Ant1 from UE1 Ant1. $T_{m1-Rx}^{UE2-11}$ is the second UE Ant1 receive timing of SL slot m1 from the first UE Ant1, defined by, e.g., the first detected path in time.

A second UE receives the SL positioning reference signal in slot m1 or m'1 at time $T_{m1-Rx}^{UE2-12}$ or $T_{m'1-Rx}^{UE2-12}$ on Ant1 from UE1 Ant2. $T_{m1-RX}^{UE2-12}$ or $T_{m'1-Rx}^{UE2-12}$ is the second UE Ant1 receive timing of SL slot m1 or slot m'1 from the first UE Ant2, defined by, e.g., the first detected path in time.

A second UE receives the SL positioning reference signal in slot m1 at time $T_{m1-Rx}^{UE2-21}$ on Ant2 from UE1 Ant1. $T_{m1-Rx}^{UE2-21}$ is the second UE Ant2 receive timing of SL slot m1 from the first UE Ant1, defined by, e.g., the first detected path in time.

A second UE receives the SL positioning reference signal in slot m1 or m'1 at time $T_{m1-Rx}^{UE2-22}$ or $T_{m'1-Rx}^{UE2-22}$ on Ant2 from UE1 Ant2. $T_{m1-Rx}^{UE2-22}$ or $T_{m'1-Rx}^{UE2-12}$ is the second UE Ant2 received timing of SL slot m1 or slot m'1 from the first UE Ant2, defined by, e.g., the first detected path in time.

The time for transmission from the second UE Ant1 in slot n1 is $T_{n1-Tx}^{UE2-11}$. $T_{n1-Tx}^{UE2-11}$ is the second UE Ant1 transmit timing of SL slot n1 corresponding to (e.g., closest in time to slot m1 received from the first UE Ant1). In one example m1=n1.

The time for transmission from the second UE Ant1 in slot n1 is $T_{n1-Tx}^{UE2-12}$. $T_{n1-Tx}^{UE2-12}$ is the second UE Ant1 transmit timing of SL slot n1 corresponding to (e.g., closest in time to slot m1 or m'1 received from the first UE Ant2). In one example m1=n1. In one example, $T_{n1-Tx}^{UE2-11}=T_{n1-Tx}^{UE2-12}$.

The time for transmission from the second UE Ant2 in slot n1 is $T_{n1-Tx}^{UE2-21}$. $T_{n1-Tx}^{UE2-21}$ is the second UE Ant2 transmit timing of SL slot n1 corresponding to (e.g., closest in time to slot m1 received from the first UE Ant1). In one example m1=n1.

The time for transmission from the second UE Ant2 in slot n1 is $T_{n1-Tx}^{UE2-22}$. $T_{n1-Tx}^{UE2-22}$ is the second UE Ant2 transmit timing of SL slot n1 corresponding to (e.g., closest in time to slot m1 or m'1 received from the first UE Ant2). In one example m1=n1. In one example, $T_{n1-Tx}^{UE2-21}=T_{n1-Tx}^{UE2-21}$.

The second UE calculates the UE Rx–Tx time difference in slot m1 for each antenna pair as: (1) $T_{Rx-Tx}^{UE2-11}$ (m1)=$T_{m1-Rx}^{UE2-11}-T_{n1-Tx}^{UE2-11}$, or $T_{Rx-Tx}^{UE2-11}$(m1)=

$T_{m1-Rx}^{UE2-11}-T_{m1-Tx}^{UE2-11}$, if m1=n1; (2) $T_{Rx-Tx}^{UE2-12}$ (m1)=$T_{m1-Rx}^{UE2-12}-T_{n1-Tx}^{UE2-12}$, or $T_{Rx-Tx}^{UE2-12}$(m1)= $T_{m1-Rx}^{UE2-12}-T_{m1-Tx}^{UE2-12}$, if m1=n1; (3) $T_{Rx-Tx}^{UE2-21}$ (m1)=$T_{m1-Rx}^{UE2-21}-T_{n1-Tx}^{UE2-21}$, or $T_{Rx-Tx}^{UE2-21}$(m1)= $T_{m1-Rx}^{UE2-21}-T_{m1-Tx}^{UE2-21}$, if m1=n1; and (4) $T_{Rx-Tx}^{UE2-22}$ (m1)=$T_{m1-Rx}^{UE2-22}-T_{n1-Tx}^{UE2-22}$, or $T_{Rx-Tx}^{UE2-22}$(m1)= $T_{m1-Rx}^{UE2-22}-T_{m1-Tx}^{UE2-22}$, if m1=n1. In one example, UE2 can report $T_{Rx-Tx}^{UE2-11}$(m1) and/or $T_{Rx-Tx}^{UE2-22}$(m1) and/or $T_{Rx-Tx}^{UE2-21}$(m1) and/or $T_{Rx-Tx}^{UE2-22}$(m1) to UE1, e.g., for UE-based positioning. In one example, UE2 can report $T_{Rx-Tx}^{UE2-11}$(m1) and/or $T_{Rx-Tx}^{UE2-12}$(m1) and/or $T_{Rx-Tx}^{UE2-21}$(m1) and/or $T_{Rx-Tx}^{UE2-22}$(m1) to a network element (e.g., LMF and/or gNB), e.g., for UE-assisted positioning.

In one example, slot m1 or m'1 can be replaced by sub-frame m1 or m'1, or frame m1 or m'1, or SFN m1 or m'1, or symbol m1 or m'1, respectively, and correspondingly, slot n1 can be replaced by sub-frame n1 or frame n1 or SFN n1 or symbol n1.

In one example, a second UE is configured with a positioning reference signal on the SL interface (e.g., SL PRS) to be transmitted from the first antenna of the second UE and from the second antenna of the second UE. The transmitted DL PRS from different antennas of the second UE (e.g., car2) are orthogonal.

The orthogonality can be in: (1) time domain, i.e., different TRPs or antenna panels transmit in different time intervals (e.g., different symbols or different slots or different subframes, or different frames, . . . ); (2) frequency domain, i.e., different TRPs transmit in different frequency intervals (e.g., in different sub-carriers, or in different PRBs or using different comb shifts (e.g., comb offsets), . . . ); and/or (3) code domain, i.e., different TRPs transmit using sequences that are orthogonal or quasi-orthogonal to each other.

The configuration of the SL PRS can include (some or all of these parameters can be different for different antennas or antenna panels): (1) time domain resources, e.g., number of symbols and starting position (e.g., starting symbol) within a slot of DL PRS; (2) time domain behavior, whether transmission is aperiodic, semi-persistent or periodic transmission, including periodicity for semi-persistent and periodic transmissions; (3) frequency domain resources, e.g., starting position in frequency domain (e.g., FD shift), and length in frequency domain (e.g., number of PRBs or C-SRS); (4) transmission comb related information. A number of transmission combs and transmission comb offset; and (5) code domain information, e.g., sequence ID, and group or sequence hopping type (e.g., groupHopping, or sequenceHopping, or neither).

Some of the aforementioned parameters can be common for the first UE and the second UE, e.g., configured with a common configuration, and some can be distinct, e.g., specific for each UE.

The second UE transmits a SL positioning reference signal in slot n2 for Ant1 and Ant2. Alternatively, the second UE transmits a first SL positioning reference signal in slot n1 from Ant1 and a second SL positioning reference signal in slot n'1 from Ant2.

A first UE receives the SL positioning reference signal in slot n2 at time $T_{n2-Rx}^{UE1-11}$ on Ant1 from UE2 Ant1. $T_{n2-Rx}^{UE1-11}$ is the first UE Ant1 receive timing of SL slot n2 from the second UE Ant1, defined by, e.g., the first detected path in time.

A first UE receives the SL positioning reference signal in slot n2 or n'2 at time $T_{n2-Rx}^{UE1-12}$ or $T_{n'1-Rx}^{UE1-12}$ on Ant1 from UE2 Ant2. $T_{n2-Rx}^{UE1-12}$ or $T_{n'2-Rx}^{UE1-12}$ is the first UE Ant1 received timing of SL slot n2 or slot m'2 from the second UE Ant2, defined by, e.g., the first detected path in time.

A first UE receives the SL positioning reference signal in slot n2 at time $T_{n2\text{-}Rx}^{UE1\text{-}21}$ on Ant2 from UE2 Ant1. $T_{n2\text{-}Rx}^{UE1\text{-}21}$ is the first UE Ant2 received timing of SL slot n2 from the second UE Ant1, defined by, e.g., the first detected path in time.

A first UE receives the SL positioning reference signal in slot n2 or n'2 at time $T_{n2\text{-}Rx}^{UE1\text{-}22}$ or $T_{n'2\text{-}Rx}^{UE1\text{-}22}$ on Ant2 from UE2 Ant2. $T_{n2\text{-}Rx}^{UE1\text{-}22}$ or $T_{n'2\text{-}Rx}^{UE1\text{-}12}$ is the first UE Ant2 received timing of SL slot n2 or slot n'2 from the second UE Ant2, defined by, e.g., the first detected path in time.

The time for transmission from the first UE Ant1 in slot m2 is $T_{m2\text{-}Tx}^{UE1\text{-}11}$. $T_{m2\text{-}Tx}^{UE1\text{-}11}$ is the first UE Ant1 transmit timing of SL slot m2 corresponding to (e.g., closest in time to slot n2 received from the second UE Ant1). In one example m2=n2.

The time for transmission from the first UE Ant1 in slot m2 is $T_{m2\text{-}Tx}^{UE1\text{-}12}$. $T_{m2\text{-}Tx}^{UE1\text{-}12}$ is the first UE Ant1 transmit timing of SL slot m2 corresponding to (e.g., closest in time to slot n2 or n'2 received from the second UE Ant2). In one example m2=n2. In one example, $T_{m2\text{-}Tx}^{UE1\text{-}11}= T_{m2\text{-}Tx}^{UE1\text{-}12}$.

The time for transmission from the first UE Ant2 in slot m2 is $T_{m2\text{-}Tx}^{UE1\text{-}21}$. $T_{m2\text{-}Tx}^{UE1\text{-}21}$ is the first UE Ant2 transmit timing of SL slot m2 corresponding to (e.g., closest in time to slot n2 received from the second UE Ant1). In one example m2=n2.

The time for transmission from the first UE Ant2 in slot m2 is $T_{m2\text{-}Tx}^{UE1\text{-}22}$. $T_{m2\text{-}Tx}^{UE1\text{-}22}$ is the first UE Ant2 transmit timing of SL slot m2 corresponding to (e.g., closest in time to slot n2 or n'2 received from the second UE Ant2). In one example m2=n2. In one example, $T_{m2\text{-}Tx}^{UE1\text{-}21}= T_{m2\text{-}Tx}^{UE1\text{-}22}$.

The first UE calculates the UE Rx–Tx time difference in slot n2 for each antenna pair as: (1) $T_{Rx\text{-}Tx}^{UE1\text{-}11}(n2)= T_{n2\text{-}Rx}^{UE1\text{-}11}-T_{m2\text{-}Tx}^{UE1\text{-}11}$ or $T_{Rx\text{-}Tx}^{UE1\text{-}11}(n2)= T_{n2\text{-}Rx}^{UE1\text{-}11}-T_{n2\text{-}Tx}^{UE1\text{-}11}$, if m2=n2; (2) $T_{Rx\text{-}Tx}^{UE1\text{-}12}(n2)=T_{n2\text{-}Rx}^{UE1\text{-}12}-T_{m2\text{-}Tx}^{UE1\text{-}12}$, or $T_{Rx\text{-}Tx}^{UE1\text{-}12}(n2)= T_{n2\text{-}Rx}^{UE1\text{-}12}-T_{n2\text{-}Tx}^{UE1\text{-}12}$, if m2=n2; (3) $T_{Rx\text{-}Tx}^{UE1\text{-}21}(n2)=T_{n2\text{-}Rx}^{UE1\text{-}21}-T_{m2\text{-}Tx}^{UE1\text{-}21}$ or $T_{Rx\text{-}Tx}^{UE1\text{-}21}(n2)= T_{n2\text{-}Rx}^{UE1\text{-}21}-T_{n2\text{-}Tx}^{UE1\text{-}21}$, if m2=n2; and (4) $T_{Rx\text{-}Tx}^{UE1\text{-}22}(n2)=T_{n2\text{-}Rx}^{UE1\text{-}22}-T_{m2\text{-}Tx}^{UE1\text{-}22}$ or $T_{Rx\text{-}Tx}^{UE1\text{-}22}(n2)= T_{n2\text{-}Rx}^{UE1\text{-}22}-T_{n2\text{-}Tx}^{UE1\text{-}22}$, if m2=n2. In one example, UE1 can report $T_{Rx\text{-}Tx}^{UE1\text{-}11}(n2)$ and/or $T_{Rx\text{-}Tx}^{UE1\text{-}12}(n2)$ and/or $T_{Rx\text{-}Tx}^{UE1\text{-}21}(n2)$ and/or $T_{Rx\text{-}Tx}^{UE1\text{-}22}(n2)$ to UE2, e.g., for UE-based positioning. In one example, UE1 can report $T_{Rx\text{-}Tx}^{UE1\text{-}11}(n2)$ and/or $T_{Rx\text{-}Tx}^{UE1\text{-}12}(n2)$ and/or $T_{Rx\text{-}Tx}^{UE1\text{-}21}(n2)$ and/or $T_{Rx\text{-}Tx}^{UE1\text{-}22}(n2)$ to a network element (e.g., LMF and/or gNB), e.g., for UE-assisted positioning.

In one example, slot n2 or n'2 can be replaced by sub-frame n2 or n'2, or frame n2 or n'2, or SFN n2 or n'2, or symbol n2 or n'2 respectively and correspondingly, slot m2 can be replaced by sub-frame m2 or frame m2 or SFN m2 or symbol m2.

The round-trip times, and according to the distances between each pair of antennas can be measured and calculated as described above. If the vehicles are stationary relative to each other or moving at a slot speed relative to each other the slots for measuring the round-trip time can be different. If round trip changes between measurements, the slots used for measuring the distance at a certain time can be the same (as described in examples of the present disclosure) or in close time proximity to each other.

Alternatively, Rx–Tx can be calculated from measurements in different slots to refer to the same slot for both UEs are described in example of the present disclosure.

Between Ant1 of Car1 and Ant1 of Car2: $d_1^2=x_1^2+y_1^2$, and between Ant2 of Car1 and Ant1 of Car2: $d_3^2=(x_1-D_1)^2+y_1^2$. Using, these two equations, $x_1$ and $y_1$ can be calculated. There is an ambiguity in the sign of $y_1$, that can be resolved if a third antenna in Car1 is added.

Between Ant1 of Car1 and Ant2 of Car2: $d_2^2=x_2^2+y_2^2$, and between Ant2 of Car1 and Ant2 of Car2: $d_4^2=(x_2-D_1)^2+y_1^2$. Using, these two equations, $x_2$ and $y_2$ can be calculated. There is an ambiguity in the sign of $y_2$, that can be resolved if a third antenna in Car1 is added.

In one example, a transmission from a UE1 in slot (or symbol) $m_1$ arrives at time $T_{m1\text{-}Rx}^{UE2}$ at a UE2 in slot (or symbol) $n_1$, time $T_{m1\text{-}Rx}^{UE2}$ is measured in UE2's timeline. There is no transmission in slot (or symbol) $n_1$ for the UE2, but a would-be (virtual or reference) transmission from UE-B may take place at starting at time $T_{n1\text{-}Tx}^{UE2}$. The UE2 can measure the difference between its virtual/reference transmit time ($T_{n1\text{-}Tx}^{UE2}$) and the actual receive time of a transmission from UE-A ($T_{m1\text{-}Rx}^{UE2}$). i.e., $T_{Rx\text{-}Tx}^{UE2}(m1)=T_{m1\text{-}Rx}^{UE2}-T_{n1\text{-}Tx}^{UE2}$.

In one example, the slot (or symbol) numbering of UE1 and UE2 are synchronized, i.e., $m_1=n_1$. In another example, the slot (or symbol) numbering of UE1 and UE2 is not synchronized, i.e., i.e., $m_1 \neq n_1$.

The clock bias between the UE1 and the UE2 in slot (or symbol) $m_1$/slot (or symbol) $n_1$ is $\delta_1$, such that $T_{m1\text{-}Tx}^{UE1}-T_{n1\text{-}Tx}^{UE2}=\delta_1$. The propagation time from UE1 to UE2 at the start of slot (or symbol) $m_1$/slot (or symbol) $n_1$ is $T_{p1}= T_{m1\text{-}Rx}^{UE2}-T_{m1\text{-}Tx}^{UE1}=T_{m1\text{-}Rx}^{UE2}-T_{n1\text{-}Tx}^{UE2}-\delta_1=T_{Rx\text{-}Tx}^{UE2}(m1)-\delta_1$. Therefore, $T_{Rx\text{-}Tx}^{UE2}(m1)=T_{p1}+\delta_1$ (1).

Similarly, for a transmission from the UE2 to the UE1 in slot (or symbol) $n_2$/slot (or symbol) $m_2$, where a UE1 measures the difference between its would-be (virtual or reference) transmit time in slot (or symbol) $m_2$ and the actual receive time of the SL PRS from the UE2 in slot (or symbol) $n_2$/slot (or symbol) $m_2$, i.e., $T_{Rx\text{-}Tx}^{UE1}(n2)$, it can be shown that $T_{Rx\text{-}Tx}^{UE1}(n2)=T_{p2}-\delta_2$ (2).

Where $T_{p2}$ is the propagation time from the UE2 to the UE1 at the start of slot (or symbol) $n_2$/slot (or symbol) $m_2$, and $\delta_2$ is the clock bias between the UE1 and the UE2 in slot (or symbol) $n_2$/slot (or symbol) $m_2$. In one example, the slot (or symbol) numbering of UE1 and UE2 are synchronized, i.e., $m_2=n_2$. In another example, the slot (or symbol) numbering of UE1 and UE2 is not synchronized, i.e., i.e., $m_2 \neq n_2$. In one example, $m_2-m_1=n_2-n_1$.

If the UEs are relatively stationary, i.e., $T_{p1}=T_{p2}=T_p$ and there is no change in clock bias, i.e., $\delta_1=\delta_2=\delta$. Therefore, $T_{Rx\text{-}Tx}^{UE2}(m1)+T_{Rx\text{-}Tx}^{UE1}(n2)=2T_p$, where $2T_p$ is the round-trip propagation delay. This is equivalent to the single-side RTT method.

In one example, the clock bias between the UE1 and the UE2 changes overtime. The UE1 has a clock with a bias $\varepsilon_1$, hence the slot (or symbol) duration in the UE1 is $T_s(1+\varepsilon_1)$, where $T_s$ is the reference slot (or symbol) time. Similarly, the UE2 has a clock with a bias $\varepsilon_2$, hence the slot (or symbol) duration in the UE2 is $T_s(1+\varepsilon_2)$. Therefore, if the clock bias in slot (or symbol) $m_1$/slot (or symbol) $n_1$ is $\delta_1$, the clock bias in slot (or symbol) $m_2$/slot (or symbol) $n_2$ is given by: $\delta_2=T_{m2\text{-}Tx}^{UE1}-T_{n2\text{-}Tx}^{UE2}=(T_{m1\text{-}Tx}^{UE1}+T_s(1+\varepsilon_1)(m_2-m_1)-(T_{n1\text{-}Tx}^{UE2}+T_s(1+\varepsilon_2)(n_2-n_1))$. $\delta_2=T_{m1\text{-}Tx}^{UE1}-T_{n1\text{-}Tx}^{UE2}+T_s (\varepsilon_1-\varepsilon_2)(m_2-m_1)=\delta_1+T_s(\varepsilon_1-\varepsilon_2)(m_2-m_1)$ where $m_2-m_1=n_2-n_1$.

Therefore, adding $T_{Rx\text{-}Tx}{}^{UE2}(m1)+T_{Rx\text{-}Tx}{}^{UE1}(n2)$, it may get: $T_{Rx\text{-}Tx}{}^{UE2}(m1)+T_{Rx\text{-}Tx}{}^{UE1}(n2)=2T_p-T_s(\varepsilon_1-\varepsilon_2)(m_2-m_1)$ (3).

To handle the clock drift between the UE1 and the UE2, a third measurement can be performed at slot (or symbol) $m_3$/slot (or symbol) $n_3$ for a SL-PRS transmitted from the UE1 to the UE2. For a transmission from the UE1 to the UE2 in slot (or symbol) $m_3$/slot (or symbol) $n_3$, where the UE2 measures the difference between its would-be (virtual or reference) transmit time in slot (or symbol) $m_3$/slot (or symbol) $n_3$ and the actual receive time of the SL PRS from the UE1 in slot (or symbol) $m_3$/slot (or symbol) $n_3$, i.e., $T_{Rx\text{-}Tx}{}^{UE2}(m3)$, it can be shown that $T_{Rx\text{-}Tx}{}^{UE2}(m3)=T_{p3}+\delta_3$ (4) where $T_{p3}$ is the propagation time from the UE1 to the UE2 at the start of slot (or symbol) $m_3$, and $\delta_3$ is the clock bias between the UE1 and the UE2 in slot (or symbol) $m_3$.

In one example, the slot (or symbol) numbering of UE1 and UE2 are synchronized, i.e., $m_3=n_3$. In another example, the slot (or symbol) numbering of UE1 and UE2 is not synchronized, i.e., i.e., $m_3 \neq n_3$. In one example, $m_3-m_2=n_3-n_2$.

With a clock drift between the UE1 and the UE2, it can show that $\delta_3=\delta_2+T_s(\varepsilon_1-\varepsilon_2)(m_3-m_2)$, when the UEs are relatively stationary, it may get from adding equations (2) and (4): $T_{Rx\text{-}Tx}{}^{UE1}(n2)+T_{Rx\text{-}Tx}{}^{UE2}(m3)=2T_p+T_s(\varepsilon_1-\varepsilon_2)(m_3-m_2)$ (5).

In one example, if $m_2-m_1=m_3-m_2$, (and $n_2-n_1=n_3-n_2$), it can add equations (3) and (5) to get $T_p$: $T_{Rx\text{-}Tx}{}^{UEB}(m1)+2T_{Rx\text{-}Tx}{}^{UEA}(m2)+T_{Rx\text{-}Tx}{}^{UEB}(m3)=4T_p$.

In general, it can multiply equation (3) by $(m_3-m_2)$ and multiply equation (5) by $(m_2-m_1)$ and add to get: $(T_{Rx\text{-}Tx}{}^{UE2}(m1)+T_{Rx\text{-}Tx}{}^{UE1}(n2))(m_3-m_2)+(T_{Rx\text{-}Tx}{}^{UE1}(n2)+T_{Rx\text{-}Tx}{}^{UE2}(m3))(m_2-m_1)=2(m_3-m_1)T_p$.

Therefore, the round-trip propagation delay can be given by:

$$2T_p =$$

$$\left(T_{Rx\text{-}Tx}^{UE2}(m1) + T_{Rx\text{-}Tx}^{UE1}(n2)\right)\frac{m_3-m_2}{m_3-m_1} + \left(T_{Rx\text{-}Tx}^{UE1}(n2) + T_{Rx\text{-}Tx}^{UEB}(m3)\right)\frac{m_2-m_1}{m_3-m_1}.$$

In another example, there is no clock drift, the clock bias in slots (or symbols) $m_1/n_1$, $m_2/n_2$ and $m_3/n_3$ is the same, i.e., $\delta_1=\delta_2=\delta_3=\delta$. The UE-B is moving with a relative speed v from the UE-A, if the propagation delay at slot (or symbol) $m_2$ is $T_{p2}=T_p$, the propagation delay at slot (or symbol) $m_1$ is $$T_{p1} = T_p - \frac{(m_2-m_1)T_s v}{c},$$

where c is the speed of light. The propagation delay at slot (or symbol) $m_3$ is $$T_{p3=}T_p + \frac{(m_3-m_2)T_s v}{c}.$$

Adding equations (1) and (2), it may get:

$$T_{Rx\text{-}Tx}^{UE2}(m1) + T_{Rx\text{-}Tx}^{UE1}(n2) = 2T_p - \frac{(m_2-m_1)T_s v}{c}.$$

Adding equations (2) and (4), it may get:

$$T_{Rx\text{-}Tx}^{UE1}(n2) + T_{Rx\text{-}Tx}^{UE2}(m3) = 2T_p + \frac{(m_3-m_2)T_s v}{c}.$$

If it multiples the last two equations by $(m_3-m_2)$ and $(m_2-m_1)$, respectively and it may get: $(T_{Rx\text{-}Tx}{}^{UE2}(m1)+T_{Rx\text{-}Tx}{}^{UE1}(n2))(m_3-m_2)+(T_{Rx\text{-}Tx}{}^{UE1}(n2)+T_{Rx\text{-}Tx}{}^{UE2}(m3))(m_2-m_1)=2(m_3-m_1)T_p$.

Therefore, the round trip time at slot (or symbol) $m_2/n_2$ is given by:

$$2T_p =$$

$$\left(T_{Rx\text{-}Tx}^{UE2}(m1) + T_{Rx\text{-}Tx}^{UE1}(n2)\right)\frac{m_3-m_2}{m_3-m_1} + \left(T_{Rx\text{-}Tx}^{UE1}(n2) + T_{Rx\text{-}Tx}^{UE2}(m3)\right)\frac{m_2-m_1}{m_3-m_1}.$$

In one example, when slot (or symbol) $m_2/n_2$ is in the middle between slots (or symbols) $m_1/n_1$ and $m_3/n_3$, it may get:

$$2T_p = \frac{1}{2}\left(T_{Rx\text{-}Tx}^{UE2}(m1) + 2T_{Rx\text{-}Tx}^{UE1}(n2) + T_{Rx\text{-}Tx}^{UE2}(m3)\right).$$

In the aforementioned examples, slot n1 or n2 or n3 can be replaced by sub-frame n1 or n2 or n3, or frame n1 or n2 or n3, or SFN n1 or n2 or n3, or symbol n1 or n2 or n3 respectively and, slot m1 or m2 or m3 can be replaced by sub-frame m1 or m2 or m3, or frame m1 or m2 or m3, or SFN m1 or m2 or m3, or symbol m1 or m2 or m3 respectively.

In one example, a UE can report the difference between the receive time of a SL transmission from another UE and its reference transmit in a slot (or symbol). For example, a transmission from a UE1 in slot (or symbol) $m_1$ arrives at time $T_{m1\text{-}Rx}{}^{UE2}$ at a UE2 in slot (or symbol) $n_1$, time $T_{m1\text{-}Rx}{}^{UE2}$ is measured in UE2's timeline. There is no transmission in slot (or symbol) $n_1$ for the UE2, but a would-be (virtual or reference) transmission from a UE2 may take place at starting at time $T_{n1\text{-}Tx}{}^{UE2}$. The UE2 can measure the difference between its virtual/reference transmit time $(T_{n1\text{-}Tx}{}^{UE2})$ and the actual receive time of a transmission from the UE1 $(T_{m1\text{-}Rx}{}^{UE2})$. i.e., $T_{Rx\text{-}Tx}{}^{UE2}(m1)=T_{m1\text{-}Rx}{}^{UE2}-T_{n1\text{-}Tx}{}^{UE2}$.

In one example, the reporting range of $T_{Rx\text{-}Tx}{}^{UE2}(m1)$ can be approximately from −0.5 msec to +0.5 msec.

In one example, the reporting range of $T_{Rx\text{-}Tx}{}^{UE2}(m1)$ can be from −985024 Tc to +985024 Tc. Wherein Tc is a basic time unit for NR as defined in 3GPP standard specification TS 38.211. In various embodiments, $T_c=1/(\Delta f_{max} \cdot N_f)$, where $\Delta f_{max}$ is a maximum subcarrier spacing and $N_f$ is a FFT size (e.g., as defined in TS 38.211). For example, in certain embodiments for NR, $\Delta f_{max}=480$ kHz and $N_f=4096$.

In one example, the resolution step for reporting $T_{Rx\text{-}Tx}{}^{UE2}(m1)$ is $NT_c$. In one example, N is in the range of 1 to 32. In one example, the range of N depends on the sub-carrier spacing of SL-PRS used in the measurement. In one example, N depends on the frequency range of SL-PRS. TABLE 4 shows resolution steps.

TABLE 4

| Resolution steps | |
| --- | --- |
| SL-PRS Frequency Range | N |
| FR1 | From 4 to 32 |
| FR2 | From 1 to 32 |

In one example, the resolution step for reporting $T_{Rx-Tx}^{UE2}(m1)$ is $2^k T_c$. In one example, k is in the range of 0 to 5. In one example, the range of k depends on the sub-carrier spacing of SL-PRS used in the measurement. In one example, k depends on the frequency range of SL-PRS. TABLE 5 shows resolution steps.

TABLE 5

| Resolution steps | |
| --- | --- |
| SL-PRS Frequency Range | k |
| FR1 | From 2 to 5 |
| FR2 | From 0 to 5 |

In one example, a first UE receives a SL-PRS from a second UE. The first UE measures the time of arrival of the second UE relative to its timeline. In one example, the first UE drives its timeline based on: (1) signal received from satellite (GNSS synchronization); (2) sync signal received from a gNB; (3) sync signal received from an eNB; (4) sync signal received on the NR SL interface from another SL UE; (5) sync signal received on an LTE SL interface from an LTE SL UE; and (6) a UE determines its timeline based on its own internal timing/clock.

In one example, a UE can be (pre-)configured with the sync source to use for its reference time for SL PRS time of arrival measurement.

In one example, a UE can be (pre-)configured with the order of the sync source to use for its reference time for SL PRS time of arrival measurement. The UE uses the first sync source if it is received or detected (e.g., detected with a minimum quality (e.g., SINR) or signal strength (e.g., RSRP)), else the UE uses the second sync source and so on.

In one example, a UE can determine the sync source to use for its reference time for SL PRS time of arrival measurement. For example, the UE can determine this based on the signal strength (e.g., RSRP) and/or the quality (e.g., SINR).

FIG. 18 illustrates examples of SL measurements 1800 according to embodiments of the present disclosure. The embodiment of the SL measurements 1800 illustrated in FIG. 18 is for illustration only.

In one example, a first UE receives (1) a SL-PRS from a second UE (e.g., a reference UE) and (2) a SL-PRS from a third UE (e.g., a target UE) as illustrated in FIG. 18. The first UE measures the sidelink reference signal time difference (SL-RSTD) between the time of arrival of the second UE (reference UE) and time of arrival of the third UE relative to its timeline. SL-RSTD=Time of arrival of SL PRS of target UE-Time of arrival of reference UE.

In one example, reference UE can be determined or decided or selected based on one or more of: (1) the reference UE is (pre-)configured to the UE performing the measurement. The configuration can be network (Uu RRC) or by another SL UE. The configuration can be from the reference UE. The configuration can be from the target UE; (2) the reference UE is indicated to the UE performing the measurement. The indication can be by MAC CE signaling and/or by L1 control signaling. The indication can be from a network (e.g., gNB or eNB) by MAC CE and/or L1 control signaling (e.g., DCI). The indication can be from another SL by MAC CE and/or L1 control signaling (e.g., first stage SCI and/or second stage SCI and/or PSFCH). The indication can be from the reference UE. The indication can be from the target UE; and (3) the UE performing the SL RSTD measurement, can determine the reference UE, for example based on the quality (e.g., SINR) or signal strength (e.g., RSRP) of the SL-PRS from a potential reference UE.

In one example, the UE performing the SL RSTD measurement can indicate with the SL RSTD measurement, the ID of the reference UE and/or the ID of the reference SL PRS from the reference UE.

In one example, there can be more than one reference UE.

In one example, the reference UE can be a roadside unit (RSU).

In one example, the reference UE can be group leader or platoon leader.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A second user equipment (UE) comprising:
a transceiver configured to receive, from a first UE, a first sidelink (SL) positioning reference signal (PRS) in a first SL subframe; and
a processor operably coupled to the transceiver, the processor configured to identify a first received time information of the first SL PRS,
wherein the transceiver is further configured to transmit, to the first UE, a second SL PRS in a second SL subframe,
wherein the processor is further configured to measure a first SL receive-transmission (Rx–Tx) time difference information based on the first received time information and a transmit time information of the second SL PRS,
wherein the second SL subframe is closest in time to the first SL subframe, and
wherein a value of the first SL Rx–Tx time difference information is between –0.5 ms and +0.5 ms.

2. The second UE of claim 1, wherein:
the transceiver is further configured to report the first SL Rx–Tx time difference information,
the first SL Rx–Tx time difference information is a difference between the first received time information and the transmit time information of the second SL PRS, and
the first received time information of the first SL PRS is identified based on a first detected path in time.

3. The second UE of claim 1, wherein:

the transceiver is further configured to:

transmit, to the first UE, a third SL PRS, and receive, from the first UE, a fourth SL PRS, wherein the third SL PRS is received by the first UE in a third SL subframe, and wherein the fourth SL PRS is transmitted by the first UE in a fourth SL subframe.

4. The second UE of claim 3, wherein:

a second received time information of the third SL PRS based on a first detected path in time, a second SL Rx–Tx time difference information is measured based on the second received time information and a transmit time information of the fourth SL PRS, and a value of the second SL Rx–Tx time difference information is between –0.5 ms and +0.5 ms.

5. The second UE of claim 4, wherein:

the transceiver is further configured to receive, from the first UE, the second SL Rx–Tx time difference information, and the second SL Rx–Tx time difference is a difference between the second received time information and the transmit time information of the fourth SL PRS.

6. The second UE of claim 5, wherein the processor is further configured to calculate a round trip time information between the first UE and the second UE based on the first SL Rx–Tx time difference information and the second SL Rx–Tx time difference information.

7. A method of operating a second user equipment (UE), the method comprising:

receiving, from a first UE, a first sidelink (SL) positioning reference signal (PRS) in a first SL subframe;

identifying a first received time information of the first SL PRS;

transmitting, to the first UE, a second SL PRS in a second SL subframe; and measuring a first SL receive transmission (Rx–Tx) time difference information based on the first received time information and a transmit time information of the second SL PRS, wherein the second SL subframe is closest in time to the first SL subframe, and wherein a value of the first SL Rx–Tx time difference information is between –0.5 ms and +0.5 ms.

8. The method of claim 7, further comprising:

reporting the first SL Rx–Tx time difference, wherein the first SL Rx–Tx time difference information is a difference between the first received time information and the transmit time information of the second SL PRS, and wherein the first received time information of the first SL PRS is identified based on a first detected path in time.

9. The method of claim 7, further comprising:

transmitting, to the first UE, a third SL PRS; and receiving, from the first UE, a fourth SL PRS;

wherein the third SL PRS is received by the first UE in a third SL subframe, and wherein the fourth SL PRS is transmitted by the first UE in a fourth SL subframe.

10. The method of claim 9, wherein:

a second received time information of the third SL PRS is identified based on a first detected path in time, a second SL Rx–Tx time difference information is measured based on the second received time information and a transmit time information of the fourth SL PRS, and a value of the second SL Rx–Tx time difference information is between –0.5 ms and +0.5 ms.

11. The method of claim 10, further comprising:

receiving, from the first UE, a second SL Rx–Tx time difference information, wherein the second SL Rx–Tx time difference information is a difference between the second received time information and the transmit time information of the fourth SL PRS.

12. The method of claim 11, further comprising:

calculating, a round trip time information between the first UE and the second UE based on the first SL Rx–Tx time difference information and the second SL Rx–Tx time difference information.

* * * * *